United States Patent
Schena

(10) Patent No.: US 7,339,572 B2
(45) Date of Patent: *Mar. 4, 2008

(54) HAPTIC DEVICES USING ELECTROACTIVE POLYMERS

(75) Inventor: Bruce M. Schena, Menlo Park, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/711,400

(22) Filed: Feb. 26, 2007

(65) Prior Publication Data

US 2007/0146317 A1    Jun. 28, 2007

Related U.S. Application Data

(63) Continuation of application No. 09/866,385, filed on May 24, 2001, now Pat. No. 7,196,688.

(60) Provisional application No. 60/206,929, filed on May 24, 2000.

(51) Int. Cl.
*G09G 5/00* (2006.01)
(52) U.S. Cl. ........................ 345/156; 345/157
(58) Field of Classification Search ........ 345/156, 345/157, 163, 167, 168, 173
See application file for complete search history.

(56) References Cited

U.S. PATENT DOCUMENTS

| | | | |
|---|---|---|---|
| 3,730,621 A | 5/1973 | Sullivan, Jr. | |
| 3,935,485 A | 1/1976 | Yoshida | |
| 3,940,637 A | 2/1976 | Ohigashi et al. | |
| 4,633,123 A | 12/1986 | Radice | |
| 4,975,616 A | 12/1990 | Park | |
| 5,136,194 A | 8/1992 | Oudet et al. | |
| 5,245,245 A | 9/1993 | Goldenberg | |
| 5,389,849 A | 2/1995 | Asano et al. | |
| 5,489,812 A | 2/1996 | Furuhata et al. | |
| 5,555,894 A | 9/1996 | Doyama et al. | |
| 5,649,020 A | 7/1997 | McClurg et al. | |
| 5,650,704 A | 7/1997 | Pratt et al. | |
| 5,701,140 A | 12/1997 | Rosenberg et al. | |
| 5,861,699 A | 1/1999 | Kopac | |

(Continued)

FOREIGN PATENT DOCUMENTS

JP        7-135345        5/1995

(Continued)

OTHER PUBLICATIONS

Jackson, K. M., "Linearity of Radio-Frequency Transducers," Med. & Biol. Eng. and Computer, Jul. 1977, 15, pp. 446-449.

(Continued)

*Primary Examiner*—Ricardo Osorio
(74) *Attorney, Agent, or Firm*—Thelen Reid Brown Raysman & Steiner LLP

(57) ABSTRACT

Haptic feedback device and method for using an electroactive polymer (EAP) actuator to provide haptic feedback force sensation to a user. The device includes a sensor that detects the a user's touch on a touch surface and an electroactive polymer actuator responsive to input signals from the sensor outputs a haptic feedback force to the user caused by motion of the actuator.

20 Claims, 15 Drawing Sheets

U.S. PATENT DOCUMENTS

| | | |
|---|---|---|
| 5,896,191 A | 4/1999 | Beier et al. |
| 5,945,772 A | 8/1999 | Macnak et al. |
| 5,977,685 A | 11/1999 | Kurita et al. |
| 6,044,646 A | 4/2000 | Silverbrook |
| 6,057,828 A | 5/2000 | Rosenberg et al. |
| 6,078,126 A | 6/2000 | Rollins et al. |
| 6,379,393 B1 | 4/2002 | Mavroidis et al. |
| 6,404,107 B1 | 6/2002 | Lazarus et al. |
| 6,437,771 B1 | 8/2002 | Rosenberg et al. |
| 6,545,384 B1 | 4/2003 | Pelrine et al. |
| 6,583,533 B2 | 6/2003 | Pelrine et al. |
| 6,585,595 B1 | 7/2003 | Soma |
| 6,586,859 B2 | 7/2003 | Kornbluh et al. |
| 6,940,211 B2 | 9/2005 | Pelrine et al. |
| 7,091,950 B2 | 8/2006 | Rosenberg et al. |
| 7,196,688 B2 | 3/2007 | Schena |
| 2002/0030663 A1 | 3/2002 | Tierling et al. |

FOREIGN PATENT DOCUMENTS

| | | |
|---|---|---|
| JP | 8-335726 | 12/1996 |

OTHER PUBLICATIONS

Kashani, R., "Tuned Mass Dampers and Vibration Absorbers," www.deicon.com, pp. 1-5.

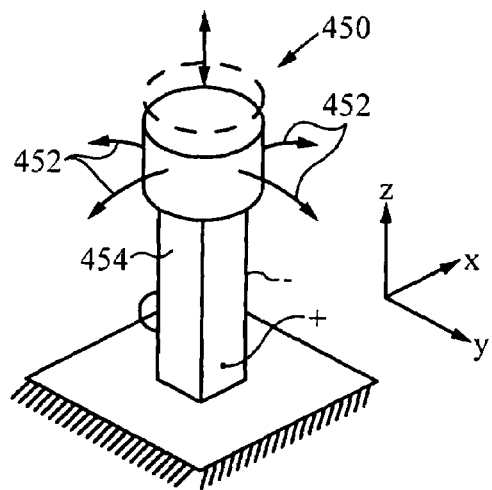
*Fig. 8a*
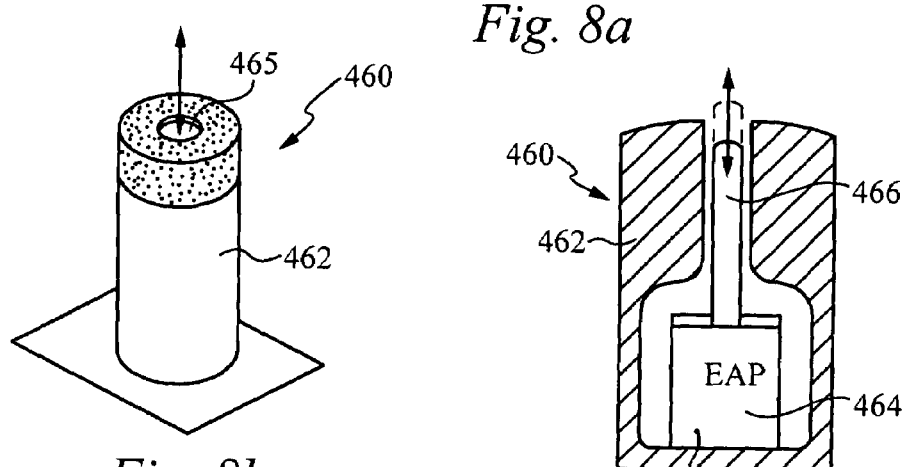
*Fig. 8b*
*Fig. 8c*
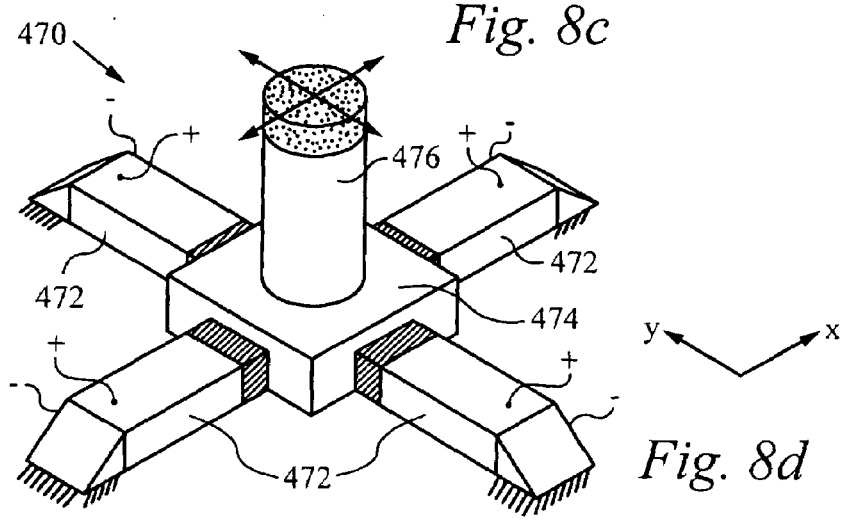
*Fig. 8d*

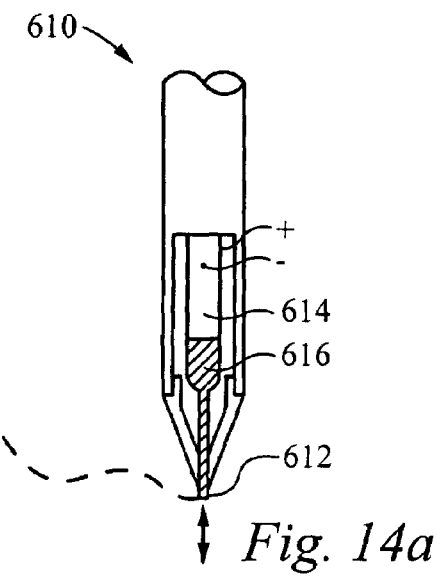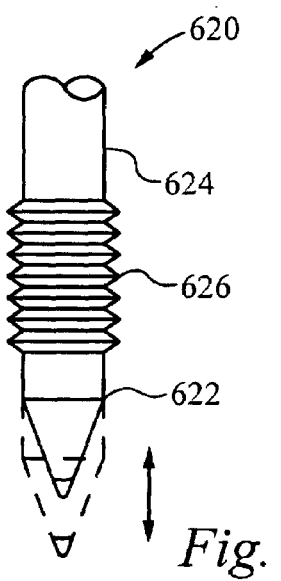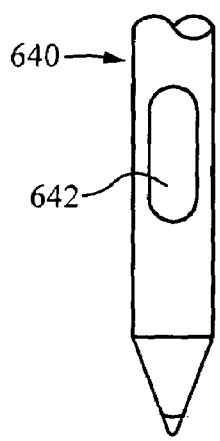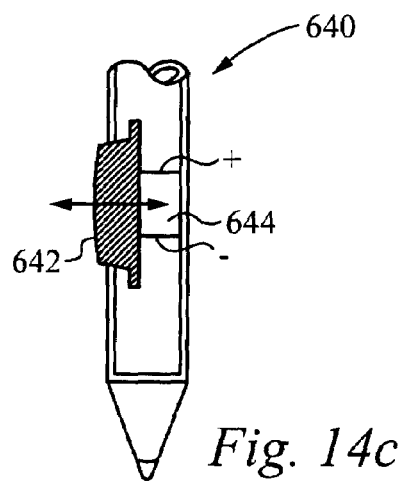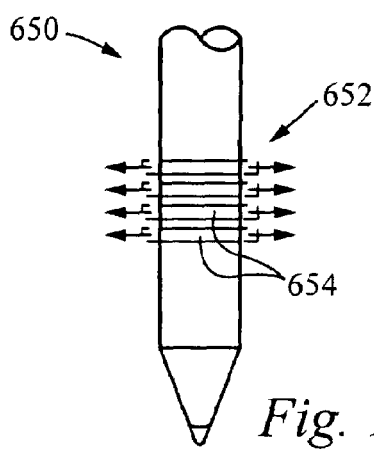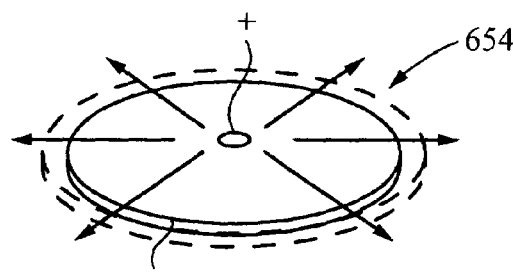
Fig. 14a  Fig. 14b  Fig. 14c  Fig. 14d  Fig. 14e

HAPTIC DEVICES USING ELECTROACTIVE POLYMERS

CROSS REFERENCE TO RELATED APPLICATIONS

This is a continuation application which claims the benefit of U.S. patent application Ser. No. 09/866,385, filed May 24, 2001 now U.S. Pat. No. 7,196,688 by Bruce M. Schena, entitled, "Haptic Devices Using Electroactive Polymers", which claims the benefit of U.S. Provisional Patent Application No. 60/206,929, filed May 24, 2000 also by Bruce M. Schena, entitled, "Haptic Feedback Devices Using Electroactive Polymers".

BACKGROUND

The present invention relates generally to interface devices for allowing humans to interface with computer systems, and more particularly to low-cost computer interface devices that allow the user to provide input to computer systems and allow computer systems to provide haptic feedback to the user.

A user can interact with an environment displayed by a computer to perform functions and tasks on the computer, such as playing a game, experiencing a simulation or virtual reality environment, using a computer aided design system, operating a graphical user interface (GUI), navigate web pages, etc. Common human-computer interface devices used for such interaction include a mouse, joystick, trackball, gamepad, steering wheel, stylus, tablet, pressure-sensitive sphere, or the like, that is connected to the computer system controlling the displayed environment. Typically, the computer updates the environment in response to the user's manipulation of a physical manipulandum such as a joystick handle or mouse. The computer senses the user's manipulation of the user object through sensors on the interface device that send locative signals to the computer. In other applications, interface devices such as remote controls allow a user to interface with the functions of an electronic device or appliance.

In some interface devices, force (kinesthetic) feedback and/or tactile feedback is also provided to the user, more generally known collectively herein as "haptic feedback." These types of interface devices can provide physical sensations which are felt by the user manipulating a user manipulandum of the interface device, such as a joystick handle, mouse, wheel, etc. One or more motors or other actuators are coupled to the manipulandum and are connected to the controlling computer system. The computer controls forces on the manipulandum and/or device housing in conjunction and coordinated with displayed events and interactions by sending control signals or commands to the actuators. The computer system can thus convey physical force sensations to the user in conjunction with other supplied feedback as the user is grasping or contacting the interface device or manipulatable object of the interface device.

One problem with current haptic feedback controllers in the home consumer market is the high manufacturing cost of such devices, which makes the devices expensive for the consumer. A large part of this manufacturing expense is due to the inclusion of complex and multiple actuators and corresponding control electronics in the haptic feedback device. In addition, high quality mechanical and force transmission components such as linkages and bearings further add to the cost of the device. Some low cost haptic devices exist, but are highly limited in their ability to output haptic sensations.

A need therefore exists for a haptic feedback device that is lower in cost to manufacture yet offers the user compelling haptic feedback to enhance the interaction with computer applications.

SUMMARY

The present invention is directed toward providing haptic feedback in an interface device using electroactive polymer (EAP) actuators, which can provide haptic sensations more efficiently and at lower cost than many existing technologies for haptic devices.

More particularly, a haptic feedback interface device of the present invention is in communication with a host computer implementing a host application program and is manipulated by a user. The interface device includes a sensor device that detects the manipulation of the interface device by the user and outputs sensor signals representative of the manipulation, and an electroactive polymer actuator responsive to input signals and operative to output a force to the user caused by motion of the actuator. The output force provides a haptic sensation to the user. The interface device may also include a device housing that is physically contacted by the user. In some embodiments, the force and haptic sensation can be correlated with an event or interaction implemented by the host computer.

Various embodiments of interface devices employing EAP actuators are described. The force output by the electroactive polymer actuator can be an inertial force that is caused by moving an inertial mass. The force output by the electroactive polymer actuator can be a rotary force, a linear force, or a force caused by bending of the EAP element or area expansion of the EAP element. The electroactive polymer actuator can move a button on the interface device to output the force to the user, or the actuator can move one or more portions of the device housing. The EAP actuator can also move an element acting as a brake shoe against a moving part of the interface device to cause a resistance to the moving part, such as an axle for a wheel, a medical tool, a disc, or other part. The EAP actuator can provide haptic sensations for a rotating wheel on said interface device, a trackpoint controller, a rotating knob, a rotating sphere, a stylus, or other manipulandums. One or more (e.g. an array) electroactive polymer actuators can also be used to move members directly into contact or in shear with skin of the user to provide tactile sensations. A method similarly provides EAP actuators in haptic sensation output.

In other aspects of the present invention, a haptic feedback interface device in communication with a host computer includes a device housing that is physically contacted by said user and an electroactive polymer (EAP) element that is able to detect a manipulation of a manipulandum of the interface device by the user and output sensor signals representative of the manipulation, as well as output a force to the user in response to an input signal, the force caused on motion of the EAP element and providing a haptic sensation to the user. The EAP element can detect contact of the user with the manipulandum, or detect an amount of pressure on the EAP element caused by the user.

The present invention advantageously provides tactile feedback sensations for a tactile feedback device using electroactive polymer actuators. These actuators have several advantages, including high energy density, rapid response time, customizability in shape and performance characteristics, compactness, easy controllability, low power consumption, high force output and deflections/amount of motion, natural stiffness, sensing and actuation functions, relatively low raw materials cost, and relatively inexpensive manufacturing cost, making them desirable for haptic feedback and sensing devices.

These and other advantages of the present invention will become apparent to those skilled in the art upon a reading of the following specification of the invention and a study of the several figures of the drawing.

BRIEF DESCRIPTION OF THE DRAWINGS

FIG. 8a is a perspective view of a trackpoint controller in which an electroactive polymer actuator provides haptic feedback in its degrees of freedom;

FIGS. 8b and 8c is perspective and side sectional views of a trackpoint controller in which an electroactive polymer actuator provides haptic feedback by linearly moving a poker against the user;

FIG. 8d is a perspective view of a trackpoint controller in which electroactive polymer actuators provide haptic feedback in linear degrees of freedom;

FIGS. 9b and 9c are perspective views of arrays of the vertical pins of FIG. 9a;

FIG. 14a is a side elevational view of a stylus in which an electroactive polymer actuator provides linear forces to the tip of the stylus;

FIG. 14b is a side elevational view of a stylus in which an electroactive polymer actuator provides linear forces to the front end of the stylus;

FIG. 14c is a side elevational view of a stylus in which an electroactive polymer actuator provides forces to a button on the stylus;

FIGS. 14d and 14e are side elevational and perspective views of a stylus in which electroactive polymer actuators provide outward forces from the stylus body;

DETAILED DESCRIPTION

Figure 1:
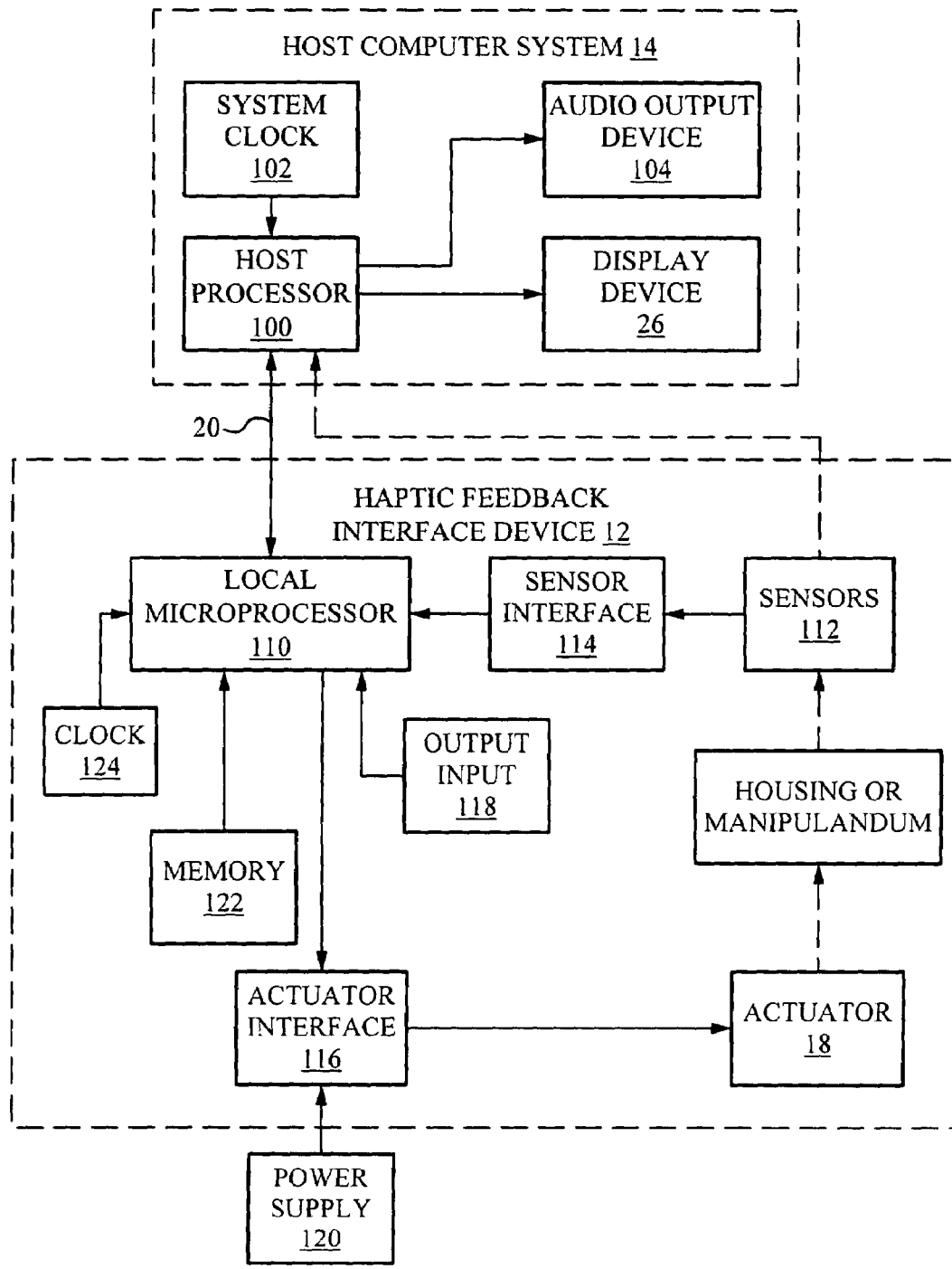
FIG. 1 is a block diagram illustrating a haptic feedback system suitable for use with the present invention.

FIG. 1 is a block diagram illustrating a haptic feedback system suitable for use with any of the described embodiments of the present invention. The haptic feedback system includes a host computer system 14 and interface device 12.

Host computer system 14 preferably includes a host microprocessor 100, a clock 102, a display screen 26, and an audio output device 104. The host computer also includes other well known components, such as random access memory (RAM), read-only memory (ROM), and input/output (I/O) electronics (not shown).

Host computer 14 can be a personal computer or workstation and may operate under any well-known operating system. Alternatively, host computer system 14 can be one of a variety of home video game console systems commonly connected to a television set or other display, such as systems available from Nintendo, Sega, Sony, or Microsoft. In other embodiments, host computer system 14 can be a "set top box" which can be used, for example, to provide interactive television functions to users, or a "network-" or "internet-computer" which allows users to interact with a local or global network using standard connections and protocols such as used for the Internet and World Wide Web. In other implementations, the host computer can be an appliance or electronic device, vehicle computer, etc.

Host computer 14 preferably implements a host application program with which a user is interacting via interface device 12 which includes haptic feedback functionality. For example, the host application program can be a video game, word processor or spreadsheet, Web page or browser that implements HTML or VRML instructions, scientific analysis program, virtual reality training program or application, or other application program that utilizes input of mouse 12 and outputs force feedback commands to the device 12. Herein, for simplicity, operating systems such as Windows™, MS-DOS, MacOS, Linux, Be, etc. are also referred to as "application programs." Herein, computer 14 may be referred as providing a "graphical environment,", which can be a graphical user interface, game, simulation, or other visual environment. The computer displays "graphical objects" or "computer objects," which are not physical objects, but are logical software unit collections of data and/or procedures that may be displayed as images by computer 14 on display screen 26, as is well known to those skilled in the art. Suitable software drivers which interface such software with computer input/output (I/O) devices are available from Immersion Corporation of San Jose, Calif.

Display device 26 can be included in host computer 14 and can be a standard display screen (LCD, CRT, flat panel, etc.), 3-D goggles, or any other visual output device. Typically, the host application provides images to be displayed on display device 26 and/or other feedback, such as auditory signals. Audio output device 104, such as speakers, is preferably coupled to host microprocessor 100 via amplifiers, filters, and other circuitry well known to those skilled in the art and provides sound output to user when an "audio event" occurs during the implementation of the host application program. Other types of peripherals can also be coupled to host processor 100, such as storage devices (hard disk drive, CD ROM drive, floppy disk drive, etc.), printers, and other input and output devices.

Interface device 12 is coupled to the computer 14 by a bus 20, which communicates signals between device 12 and computer 14 and may also, in some embodiments, provide power to the device 12. In other embodiments, signals can be sent between device 12 and computer 14 by wireless transmission/reception. In some embodiments, the power for the actuator can be supplemented or solely supplied by a power storage device provided on the device, such as a capacitor or one or more batteries. The bus 20 is preferably bi-directional to send signals in either direction between host 14 and device 12. Bus 20 can be a serial interface bus, such as an RS232 serial interface, RS-422, Universal Serial Bus (USB), MIDI, or other protocols well known to those skilled in the art; or a parallel bus or wireless link.

Device 12 can include a local microprocessor 110. Local microprocessor 110 can optionally be included within the housing of device 12 to allow efficient communication with other components of the device. Processor 110 is considered local to device 12, where "local" herein refers to processor 110 being a separate microprocessor from any processors in host computer system 14. "Local" also preferably refers to processor 110 being dedicated to haptic feedback and sensor I/O of device 12. Microprocessor 110 can be provided with software instructions (e.g., firmware) to wait for commands or requests from computer host 14, decode the command or request, and handle/control input and output signals according to the command or request. In addition, processor 110 can operate independently of host computer 14 by reading sensor signals and calculating appropriate forces from those sensor signals, time signals, and stored or relayed instructions selected in accordance with a host command. Suitable microprocessors for use as local microprocessor 110 include lower-end microprocessors as well as more sophisticated force feedback processors such as the Immersion Touchsense Processor. Microprocessor 110 can include one microprocessor chip, multiple processors and/or co-processor chips, and/or digital signal processor (DSP) capability.

Microprocessor 110 can receive signals from sensor 112 and provide signals to actuator 18 in accordance with instructions provided by host computer 14 over bus 20. For example, in a local control embodiment, host computer 14 provides high level supervisory commands to microprocessor 110 over bus 20, and microprocessor 110 decodes the commands and manages low level force control loops to sensors and the actuator in accordance with the high level commands and independently of the host computer 14. This operation is described in greater detail in U.S. Pat. Nos. 5,739,811 and 5,734,373, both incorporated herein by reference in their entirety. In the host control loop, force commands are output from the host computer to microprocessor 110 and instruct the microprocessor to output a force or force sensation having specified characteristics. The local microprocessor 110 reports data to the host computer, such as locative data that describes the position of the device in one or more provided degrees of freedom. The data can also describe the states of buttons, switches, etc. The host computer uses the locative data to update executed programs. In the local control loop, actuator signals are provided from the microprocessor 110 to an actuator 18 and sensor signals are provided from the sensor 112 and other input devices 118 to the microprocessor 110. Herein, the term "tactile sensation" refers to either a single force or a sequence of forces output by the actuator 18 which provide a sensation to the user. For example, vibrations, a single jolt, or a texture sensation are all considered tactile sensations. The microprocessor 110 can process inputted sensor signals to determine appropriate output actuator signals by following stored instructions. The microprocessor may use sensor signals in the local determination of forces to be output on the user object, as well as reporting locative data derived from the sensor signals to the host computer.

In yet other embodiments, other hardware can be provided locally to device 12 to provide functionality similar to microprocessor 110. For example, a hardware state machine incorporating fixed logic can be used to provide signals to the actuator 18 and receive sensor signals from sensors 112, and to output tactile signals.

In a different, host-controlled embodiment, host computer 14 can provide low-level force commands over bus 20, which are directly transmitted to the actuator 18 via microprocessor 110 or other circuitry. Host computer 14 thus directly controls and processes all signals to and from the device 12, e.g. the host computer directly controls the forces output by actuator 18 and directly receives sensor signals from sensor 112 and input devices 18. Other embodiments may employ a "hybrid" organization where some types of forces (e.g. closed loop effects) are controlled purely by the local microprocessor, while other types of effects (e.g., open loop effects) may be controlled by the host.

Local memory 122, such as RAM and/or ROM, is preferably coupled to microprocessor 110 in device 12 to store instructions for microprocessor 110 and store temporary and other data. In addition, a local clock 124 can be coupled to the microprocessor 110 to provide timing data, similar to system clock 102 of host computer 14.

Sensors 112 sense the position or motion of the device (e.g. the housing or a manipulandum) in degrees of freedom and provides signals to microprocessor 110 (or host 14) including information representative of the position or motion. Sensors suitable for detecting motion include digital optical encoders, other optical sensor systems, linear optical encoders, potentiometers, optical sensors, velocity sensors, acceleration sensors, strain gauge, or other types of sensors can also be used, and either relative or absolute sensors can be used. Optional sensor interface 114 can be used to convert sensor signals to signals that can be interpreted by the microprocessor 110 and/or host computer system 14, as is well known to those skilled in the art.

Actuator(s) 18 transmits forces to the housing, manipulandum, buttons, or other portion of the device in response to signals received from microprocessor 110 and/or host computer 14. Device 12 preferably includes one or more actuators which are operative to produce forces on the device 12 (or a component thereof) and haptic sensations to the user. The actuator(s) are electroactive polymer (EAP) actuators, which are described in greater detail below, and are "computer-controlled", e.g., the force output from the actuators is ultimately controlled by signals originating from a controller such as a microprocessor, ASIC, etc. Many types of additional actuators can be used in conjunction with the electroactive polymer actuators described herein, including a rotary DC motors, voice coil actuators, moving magnet actuators, pneumatic/hydraulic actuators, solenoids, speaker voice coils, piezoelectric actuators, passive actuators (brakes), etc. Actuator interface 116 can be optionally connected between actuator 18 and microprocessor 110 to convert signals from microprocessor 110 into signals appropriate to drive actuator 18. Interface 116 can include power amplifiers, switches, digital to analog controllers (DACs), analog to digital controllers (ADCs), and other components, as is well known to those skilled in the art.

In some of the implementations herein, the actuator has the ability to apply short duration force sensation on the housing or manipulandum of the device, or via moving an inertial mass. This short duration force sensation can be described as a "pulse." The "pulse" can be directed substantially along a particular direction in some embodiments. In some embodiments, the magnitude of the "pulse" can be controlled; the sense of the "pulse" can be controlled, either positive or negative biased; a "periodic force sensation" can be applied, where the periodic sensation can have a magnitude and a frequency, e.g. a sine wave; the periodic sensation can be selectable among a sine wave, square wave, saw-toothed-up wave, saw-toothed-down, and triangle wave; an envelope can be applied to the period signal, allowing for variation in magnitude over time. The wave forms can be "streamed" from the host to the device, as described in copending application Ser. No. 09/687,744, incorporated herein by reference in its entirety, or can be conveyed through high level commands that include parameters such as magnitude, frequency, and duration.

Other input devices 118 can be included in device 12 and send input signals to microprocessor 110 or to host 14 when manipulated by the user. Such input devices include buttons, dials, switches, scroll wheels, knobs, or other controls or mechanisms. Power supply 120 can optionally be included in device 12 coupled to actuator interface 116 and/or actuator 18 to provide electrical power to the actuator. or be provided as a separate component. Alternatively, power can be drawn from a power supply separate from device 12, or power can be received across bus 20. Also, received power can be stored and regulated by device 12 and thus used when needed to drive actuator 18 or used in a supplementary fashion.

The interface device 12 can be any of a variety of types; some embodiments are described further below. For example, the device 12 can be a mouse device having planar degrees of freedom, in which the entire housing is moved. Alternatively, a manipulandum on the device, such as a joystick handle, a knob, a steering wheel, a trackball, etc., is moved by the user and tracked by sensors. Device 12 can also be a gamepad, joystick, steering wheel, stylus, touchpad, spherical controller, finger pad, knob, track ball, or other device, some embodiments of which are described below. Alternatively, a hand-held remote control device used to select functions of a television, video cassette recorder, sound stereo, internet or network computer (e.g., Web-TV™) can be used with the haptic feedback components described herein, or a cell phone, personal digital assistant, etc. The forces from the actuator(s) 18 can be applied to the housing of the device 12, and/or a movable manipulandum such as a joystick handle, steering wheel, knob, button, etc.

Electroactive Polymers in Haptic Feedback Devices

Electroactive polymers (EAP) are a class of polymers which can be formulated and/or processed to exhibit a wide range of physical, electrical, and electro-optical behaviors and properties.

When activated, such as by an applied voltage, EAP materials can undergo significant physical movement or deformations, typically referred to as electrostriction. These deformations can be along the length, width, thickness, radius, etc. of the material and in some cases can exceed 10% strain. Elastic strains of this magnitude are very unusual in common materials and even more unusual in that they can be fully controlled with the proper electronic systems. Materials in this class can be used to do useful work in a compact, easy to control, low power, fast, and potentially inexpensive package. They are often referred to as "electric muscles" because of these properties. These deformation properties can be used in the present invention to provide forces to a user in a haptic feedback device.

Many of the materials can also act as high quality sensors, particularly for time-varying (i.e. AC) signals. When mechanically deformed (e.g. by bending, pulling, etc.), most EAP materials develop differential voltages which can be electrically measured. This ability to essentially generate electric potential makes them promising as force, position, velocity, acceleration, pressure, etc. sensors in haptic feedback devices of the present invention. Many of these materials exhibit bi-directional behavior, and can act as either sensors or actuators, or act simultaneously as both sensors and actuators, depending on system design.

At present, there are four main classes of EAP, each with various advantages, disadvantages, and issues. The four classes, all included in the term "electroactive polymer" herein, are gels, ionic polymers (ionic polymer metal composites or IPMC), conducting polymers, and electrorestrictive polymers. Any of these types of EAP can be used in the present invention, although some types may be more appropriate for a particular application than other types. A variety of EAP structures are described in the papers, "High-field electrostriction of elastomeric polymer dielectrics for actuator," by Kornbluh et al., "Electro-mechanics of iono-elastic beams as electrically-controllable artificial muscles," by M. Shahinpoor, "Polymer Electrolyte Actuator with Gold Electrodes," by K. Oguro et al., and "Microgripper design using electro-active polymers," by R. Lumia et al., all SPIE Conf. on Electroactive Polymer Actuators and Devices, SPIE Vol. 3669, 1999, all incorporated herein by reference.

In a majority of EAP materials, the actuation mechanism is based on the movement of ionic species either in or out of a polymer network. Currently, the most commercially viable of these is the electrostrictive polymer class.

Electrorestrictive polymers presently can be classified in two classes: dielectric and phase transition. Dielectric polymers are typically a sandwich construction of two electrically conductive (and compliant) electrodes with a dielectric polymer in between. At high electric fields (e.g., 100's to 1000's of volts), the attractive force of the electrodes squeezes the intervening dielectric such that significant motion (strain) is induced. In some cases, this strain can be greater than 50%.

Phase transition electrorestrictive materials also exhibit high strain (deformation) in the presence of electric fields, but the mechanism is a ferroelectric-to-paraelectric transformation at the molecular chain level. One example of these materials has been developed by Q. M. Zhang et al. and is electron-irradiated polyvinelidene fluoride-trifluoroethylene (P(VDF-TrFE)) copolymer, described in the paper, "Electromechanical Behavior of Electroactive P(VDF-TrFE) Copolymers", SPIE Conf. on Electroactive Polymer Actuators and Devices, SPIE Vol. 3669, 1999, and incorporated herein by reference. When processed, P(VDF-TrFE) exhibits exceptional strain (>10% in some cases), extreme energy density (Joules/cm$^3$), and high physical stiffness (elastic modulus). It is proposed that this class of materials exhibits energy densities exceeding that of traditional piezoceramics (PZT) and magnetorestrictive materials. Therefore, as described for the present invention, P(VDF-TrFE) may be nearly ideal actuator material, including intrinsic sensing capabilities, for haptic devices.

EAP materials are often derivatives of existing polymers and therefore share common processing steps with these existing products. This commonality makes EAP materials potentially economical to produce in large volume and provides repeatable quality standards. For haptic device applications, EAP materials (particularly P(VDF-TrFE)) have many potential advantages over conventional sensing and actuation methods. For example, the EAP materials have high energy density, rapid response time, customizability (shape and performance characteristics), compactness, easy controllability, low power consumption, high force output and deflections/amount of motion, natural stiffness, both sensing and actuation functions, relatively low raw materials cost, and relatively inexpensive manufacturing cost.

Configurations

EAP actuators and sensors can be configured in several different ways. Some of these configurations are described below.

Figure 2A:
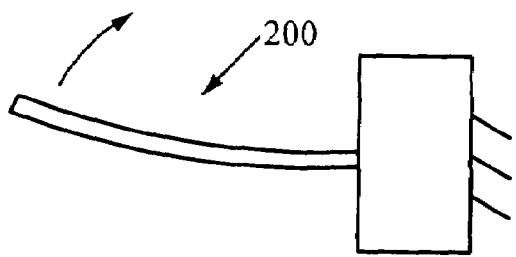
FIG. 2a is a side elevational view of an electroactive polymer element in a bending motion.
Figure 2B:
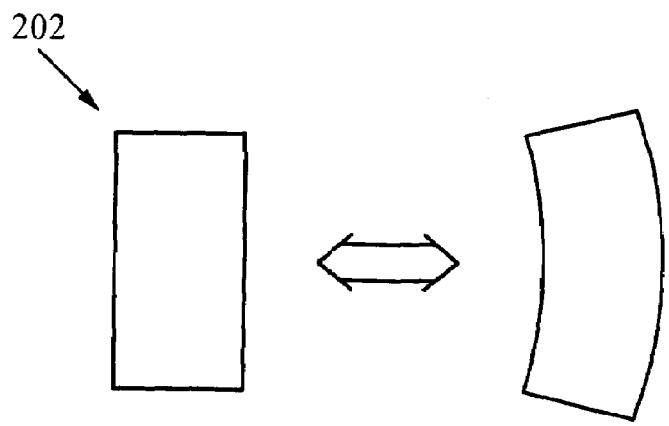
FIG. 2b is a top plan view of an electroactive polymer element in a bending motion.

Bending: A sandwich/layered "bimorph" structure can be provided which can generate single-axis displacements or forces in two directions. For example, FIG. 2a shows a side view of an EAP structure 200. A bending out of the flat plane of the structure 200 can be performed, as shown in FIG. 2a. This can be accomplished with IPMC structures, or, a polymer surrounded in a sandwich structure by a gold electrode and a carbon electrode, for example. Alternatively, as shown in the top plan view of FIG. 2b, a bending within the plane of the structure 202 can be performed, e.g. using water dragging by cation. A bending beam can also be used as a sensor, such as an IEM-Pt composite sensor placed between two electrodes.

Figure 2C:
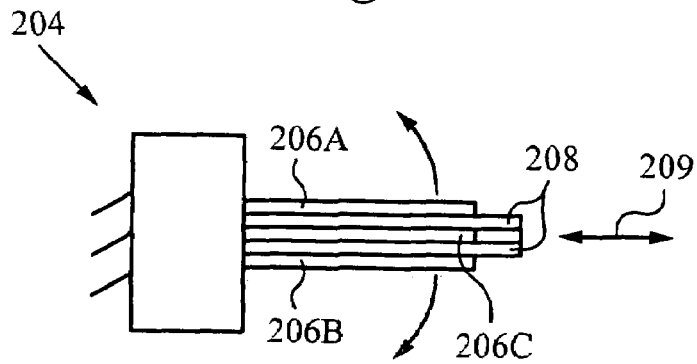
FIG. 2c is a side elevational view of an electroactive polymer sandwich structure providing linear and bending motion.

Linear motion: FIG. 2c shows a side view of a multiple layer bending beam 204 which is capable of both bending as well as longitudinal (lengthwise) displacements and forces. The beam 204 can include a top electrode 206a, a bottom electrode 206b, a middle electrode 206c, which can be made of a standard conductive material. Two elastomer layers 208 are positioned between the electrodes. A linear motion of the beam 204, as shown by arrow 209, is created by actuating both the top electrode and the bottom electrode. A bending motion can be created by actuating either the top electrode or the bottom electrode (the middle electrode is coupled to ground). Other embodiments may provide only linear, axial deflection and no bending by using a sandwich structure.

Figure 2D:
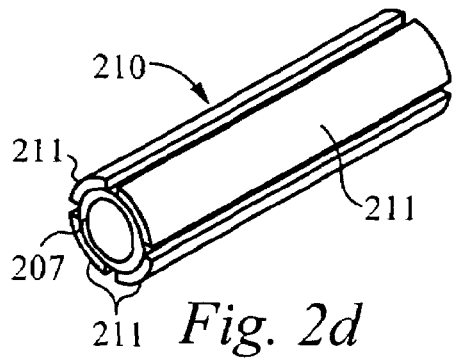
FIG. 2d is a perspective view of an electroactive polymer element in a cylindrical configuration to provide motion in multiple degrees of freedom.

Multiple degrees of freedom: FIG. 2d is a perspective view of a cylinder 210 that may deflect in two degrees of freedom (four directions) using combined signals applied to four electrodes. Four electrodes 211 are shown in this example, which are positioned on an elastomer cylindrical layer 207. In other embodiments, other three-dimensional structures of electrodes can be provided to deflect in two degrees of freedom (four directions) or additional degrees of freedom. For example, a structure having a triangular or other polygonal cross-section can be provided.

Figure 2E:
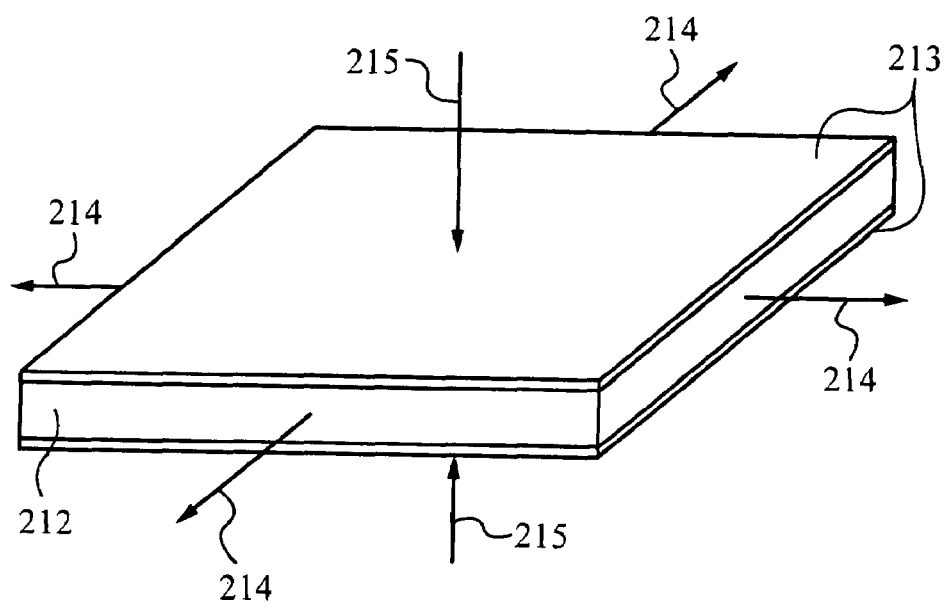
FIG. 2e is a perspective view of an electroactive polymer structure that provides an area expansion of the element.

Area expansion: FIG. 2e shows a structure including a soft dielectric 212 squeezed between two compliant electrodes 213. The dielectric 212 expands in area, e.g., along one or more linear directions, as shown by arrows 214. In other embodiments, the dielectric can expand radially (in a circular dielectric), e.g. a polymer film stretched on a rigid frame between two electrodes. Other shaped dielectrics may also be used. The thickness of the dielectric compresses simultaneously, as shown by arrows 215.

Figure 2F:
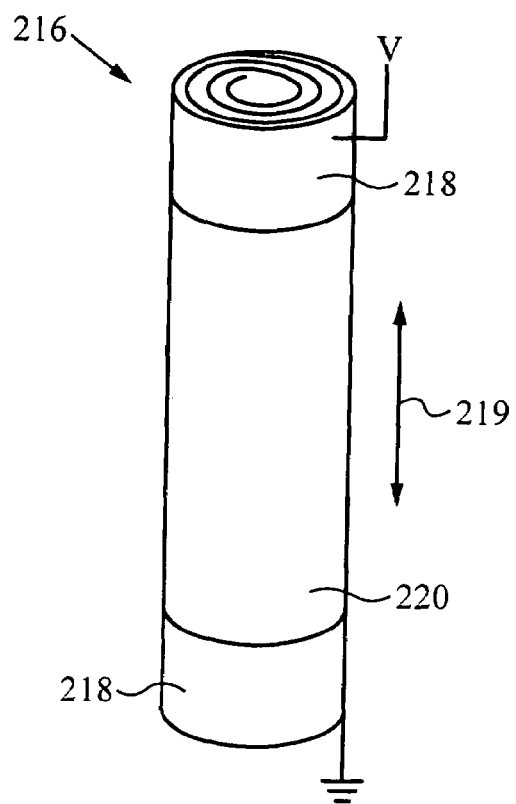
FIG. 2f is a perspective view of an electroactive polymer structure in a cylindrical structure that provides axial motion of the element.

Axial motion: FIG. 2f illustrates a sandwich structure of two polymer layers that are rolled into a cylinder 216, where electrical and mechanical connections can be made at regions 218 and the active, expanding region 220 is positioned between and includes overlapping electrodes. The resulting axial motion is indicated by arrow 219. In other embodiments, a sandwich structure can be rolled into a coil to produce rotational movement (a torque).

Diaphragm: Thin diaphragms can use planar expansion to generate in-plane or out-of-plane deflections, closing of apertures, etc.

Haptic Device Embodiments

The major classes of use contemplated for EAP actuators and sensors in haptic devices are inertial vibration actuators, linear actuators, rotational actuators, brakes, and miscellaneous uses. Many of these classes are described below in the provided example embodiments of haptic devices of the present invention.

It should be noted that the EAP actuators described in the below embodiments can be controlled by a local microprocessor in accordance with firmware and/or host computer commands or signals, or a host computer can directly control the actuator(s).

Figure 3:
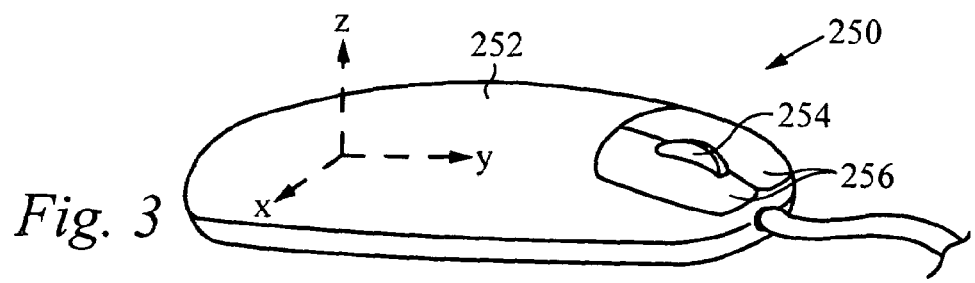
FIG. 3 is a perspective view of an example mouse interface device suitable for use with EAP actuators of the present invention.

FIG. 3 is an illustration of one example of an interface device 12 that can be used with the present invention. Mouse device 250 is a device having a housing 252 that is moved by the user in two planar degrees of freedom (x- and y-axes) to provide control signals to a host computer, e.g. to control the position of a cursor in a displayed graphical environment. As is well known to those of skill in the art, mouse device 250 includes one or more sensors to detect its x- and y position, such as a ball and roller sensor assembly, an optical sensor, or other types of sensor. A scroll wheel 254 can be provided to allow the user to provide additional input by rotating the wheel. Mouse buttons 256 can be pressed by the user to provide input signals to the host computer.

Three general types of haptic feedback are described in relation to the mouse embodiment 250; other types are also possible, and all may be implemented with other types of haptic feedback devices (joysticks, trackballs, steering wheels, laptop sensor pads, etc.). The three general types are button haptic feedback, inertial haptic feedback, and housing motion haptic feedback.

Figure 3A:
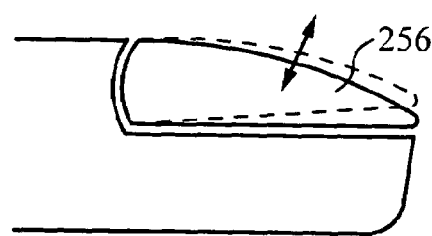
FIG. 3a is a side elevational view of a mouse embodiment in which a button is moved in its degree of freedom by an electroactive polymer actuator.
Figure 3B:
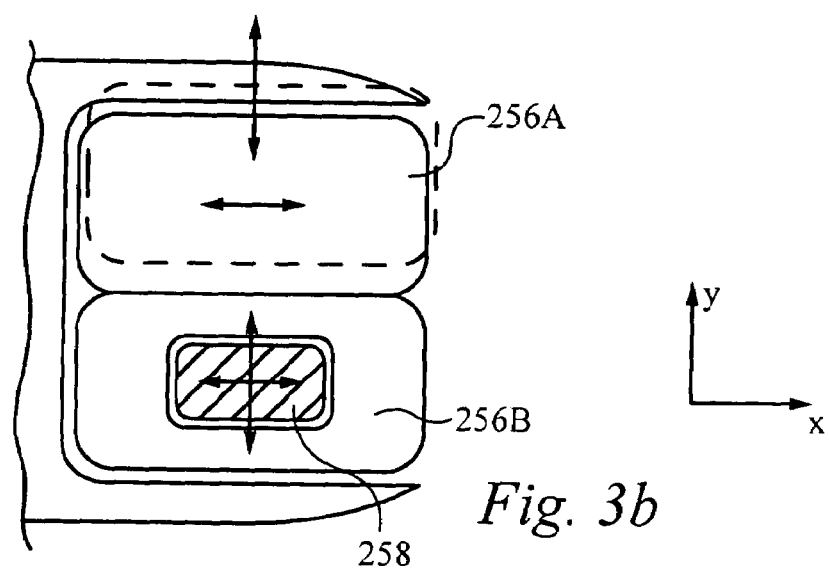
FIG. 3b is a top plan view of a mouse embodiment in which a button is moved laterally by an electroactive polymer actuator.
Figure 3C:
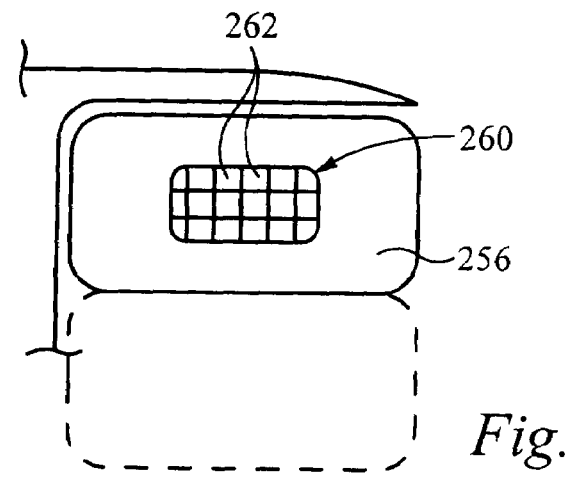
FIG. 3c is a top plan view of a mouse embodiment in which a button includes an array of multiple electroactive polymer actuators.

FIGS. 3a-3c illustrate generally the output of haptic feedback on a button. Button haptic feedback can be provided in several different ways. In FIG. 3a, the EAP actuator is used to provide haptic feedback and actuate motion of a button 256 in the button degree of freedom as shown by the arrow, i.e., in the direction of clicking or moving the button, where the button can be moved to another position as indicated by the dashed lines. The EAP structure (not shown) can, for example, be directly coupled to the button or be coupled to the button via a transmission or intermediate member (spring, flexure, etc.) For example, a linearly-extending EAP actuator can push or pull the button in its degree of freedom.

In the top plan view of FIG. 3b, an EAP actuator provides haptic feedback to button 256a in the direction of lateral button motion, i.e., motion in a direction substantially perpendicular to button motion and, in the case of a mouse embodiment, substantially parallel to mouse motion in its degree of freedom. The EAP actuator can be coupled to the button directly or through an intermediate structure. For example, a linearly-moving EAP actuator can push or pull the button from the side of the button 256a. Furthermore, the button can be moved along the x-axis or the y-axis, or along both axes, e.g. using two EAP actuators. A haptic button can also be implemented as button 256b, which is a standard button that may be clicked or pressed to provide an input signal, and which also includes a patch 258 provided on the button. The patch can be a separate film or member that can be moved by an EAP actuator independently of the surrounding portions of the button 256b. For example, as shown, the patch 258 can be positioned near the center of the button 256b; alternatively, the patch can be positioned on one side or edge of the button 256b.

FIG. 3c is a top plan view of another button embodiment, where a tactile array 260 of haptic EAP elements 262 can be placed on or a near a button 256. Each EAP element 262 of the array can be individually moved up or down on the z-axis, allowing a variety of sensations to be conveyed to the user who is contacting the array or part of the array while resting a finger on the button. In other embodiments, a 1D array (single line of elements) can be provided instead of the 2-D array shown. EAP tactile arrays are described in greater detail below.

Figure 4A:
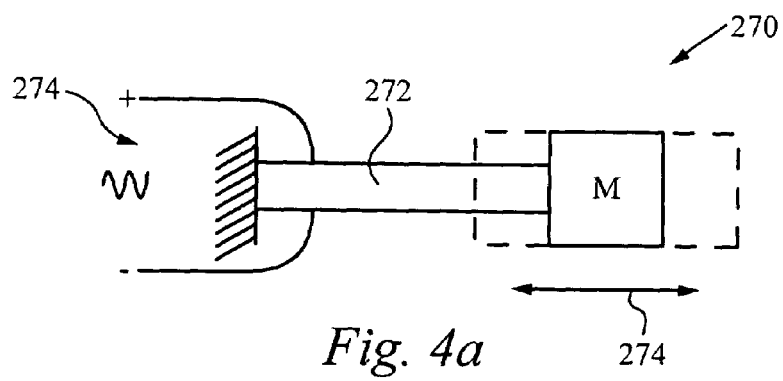
FIG. 4a is a schematic view of an embodiment in which an inertial mass is moved linearly by an electroactive polymer actuator to provide inertial sensations.

Another general type of haptic feedback is inertial feedback, which involves moving a mass with respect to an inertial ground such that the oscillations are conveyed to the user as vibrations or pulses. Inertial haptic feedback can be provided using EAP actuators of the present invention. FIG. 4a shows a linear shaker 270 using an EAP actuator, where a mass M is moved linearly by the EAP structure 272 that can move axially, as indicated by arrow 274. An oscillating control waveform 274 is input to the shaker to cause the EAP actuator to oscillate back and forth. This causes an inertial force on the housing of the device to which the EAP actuator is attached. Such feedback can be provided for a mouse, gamepad, joystick handle or base, trigger button on any device, a stylus, a tablet, a glove, a knob, a remote control, or other handheld device or structure on a device.

Figure 4B:
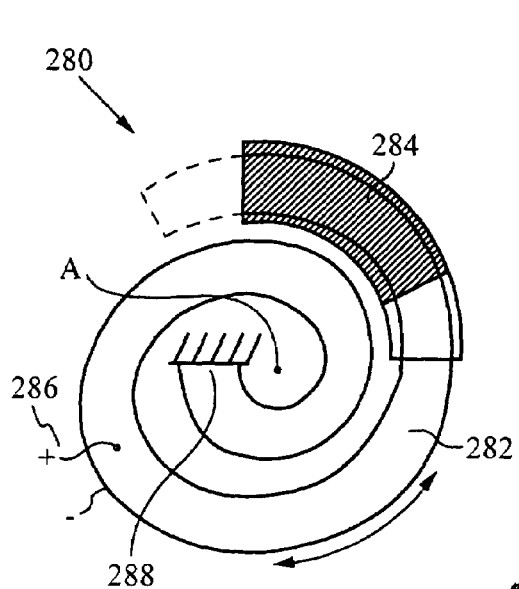
FIG. 4b is a schematic view of an embodiment in which an inertial mass is moved rotationally by an electroactive polymer actuator to provide inertial sensations.

FIG. 4b illustrates a rotary inertial EAP actuator 280, which includes an EAP element 282 that is configured like a coil to move a mass 284 in a rotational degree of freedom and thus provide rotary inertial forces to a housing or structure to which the actuator is coupled. The inner end 288 of the element 282 can be grounded to provide a reference for the other end of the element which oscillates. For example, the mass 284 can be oscillated approximately about the axis of rotation A, where examples of extreme positions are shown by the dashed lines. The positive and negative connections 286, as with all the embodiments shown with such connections herein, indicate that a signal or waveform can be applied to the EAP actuator to cause it to move.

Figure 4C:
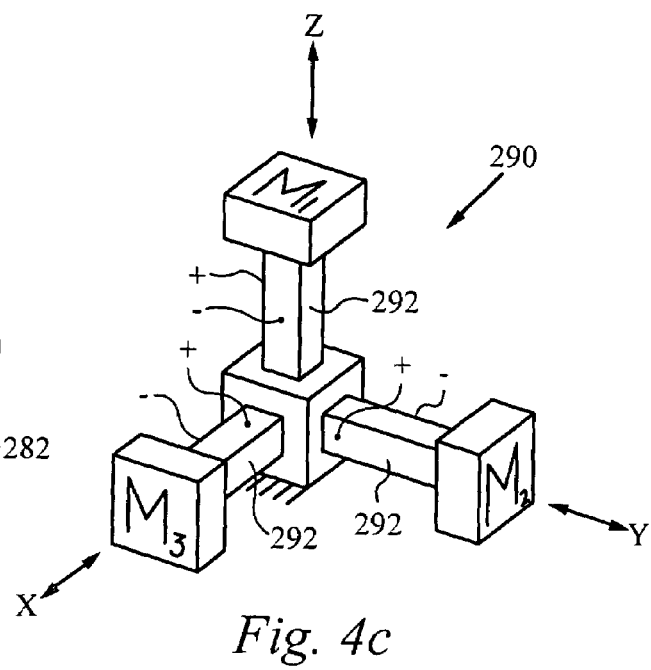
FIG. 4c is a view of an embodiment in which multiple inertial masses are moved by an electroactive polymer actuators.

FIG. 4c shows a multi-axis shaker module 290 which includes three masses M1, M2, and M3, each coupled to an associated EAP actuator structure 292 that is similar to the structure of FIG. 4a. Preferably, each EAP structure is oriented along a different axis (x, y, and z) to allow a mass to be linearly moved along the associated axis. When all three masses are moved simultaneously, inertial forces are provided in all three degrees of freedom, allowing more complex and realistic inertial haptic feedback to be output to the user of the haptic device. In other embodiments, masses and actuators are provided in only two degrees of freedom, or can be oriented at different angles.

Figure 5A:
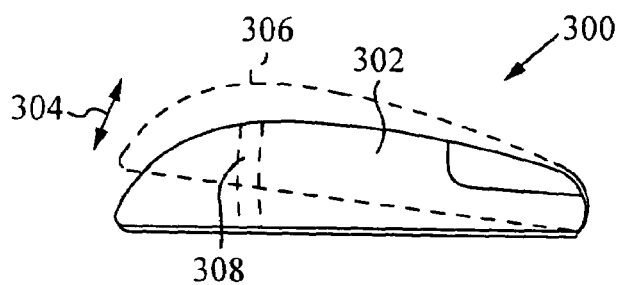
FIG. 5a is a side view of a mouse embodiment in which a entire cover portion of the mouse is moved by an electroactive polymer actuator to provide tactile sensations.

Housing motion haptic feedback is another general type of haptic feedback and can also be output according to the present invention using one or more EAP actuators. FIG. 5a shows an up-down motion of the entire housing 302 of mouse 300 (or the entire top-sides portion of the housing, excluding the bottom plate), as indicated by arrow 304 and the dashed lines 306. An EAP actuator 308 can be coupled directly to the moveable housing, as shown, and moved linearly. Or the EAP element can be coupled to the housing via a hinge, flexure, or other structure. In other embodiments, the EAP actuator can be made to bend to cause the up-down motion.

Figure 5B:
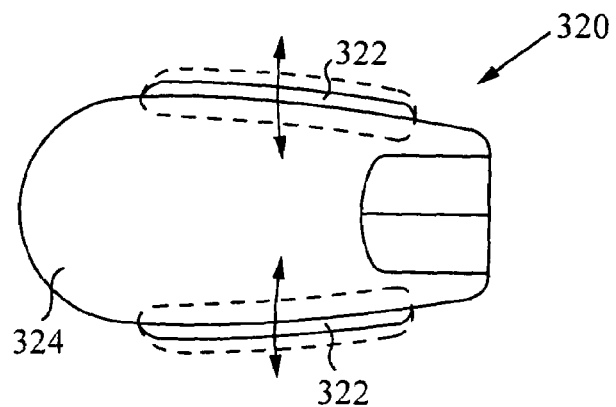
FIG. 5b is a top plan view of a mouse embodiment in which side portions of the mouse are moved by an electroactive polymer actuator to provide tactile sensations.

FIG. 5b illustrates a mouse 320 including one or more moveable sections 322 provided in or on the side housing 324 of the mouse, where an EAP actuator can be coupled to each moveable section to move it. For example, a flexible material or hinge, such as rubber or flexible plastic, can couple the moveable sections 322 to the rest of the housing 324 to allow the motion. EAP actuators that bend, move linearly, or expand in area can be used to move the sections 322.

Figure 5C:
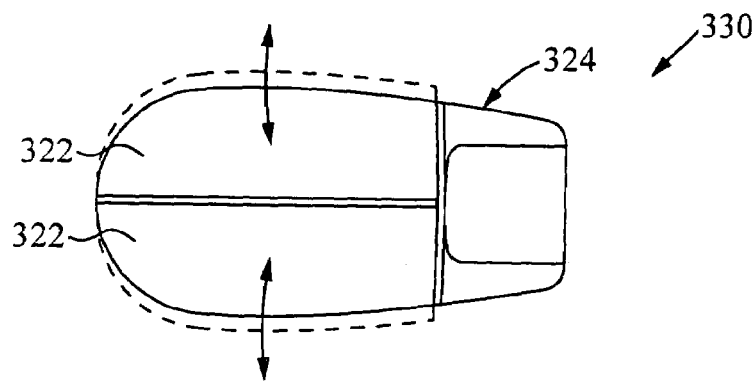
FIG. 5c is a top plan view of a mouse embodiment in which top portions of the mouse are moved by an electroactive polymer actuator to provide tactile sensations.

In FIG. 5c, a mouse 330 includes portions 332 of the housing 324 which are moveable in a split shell configuration, allowing a dedicated EAP actuator coupled to each portion 322 to drive its associated portion independently of the other portion 322. The user's palm which contacts the moving portions 322 will feel the tactile sensations as the portions are moved, such as vibrations and the like. Alternatively, the portions 322 can be driven simultaneously or with a single EAP actuator having linkages to both sections.

Figure 5D:
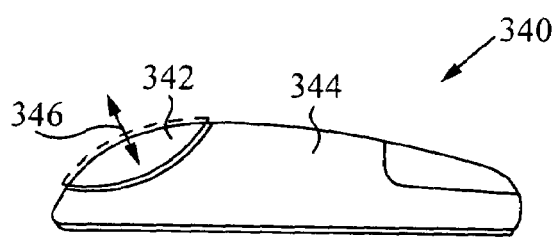
FIG. 5d is a side view of a mouse embodiment in which a rear top portion of the mouse is moved by an electroactive polymer actuator to provide tactile sensations.

FIG. 5d shows a mouse 340 including an upper portion 342 of the housing moveable with respect to the remaining housing portion 344 as shown by arrow 346 and driven by an EAP actuator, where the user's palm contacts the moveable portion to feel the haptic contact forces. A hinge or other flexure can couple the moveable portion 342 with the base portion 344. Differently-sized portions 342 can be provided in other embodiments.

Figure 6:
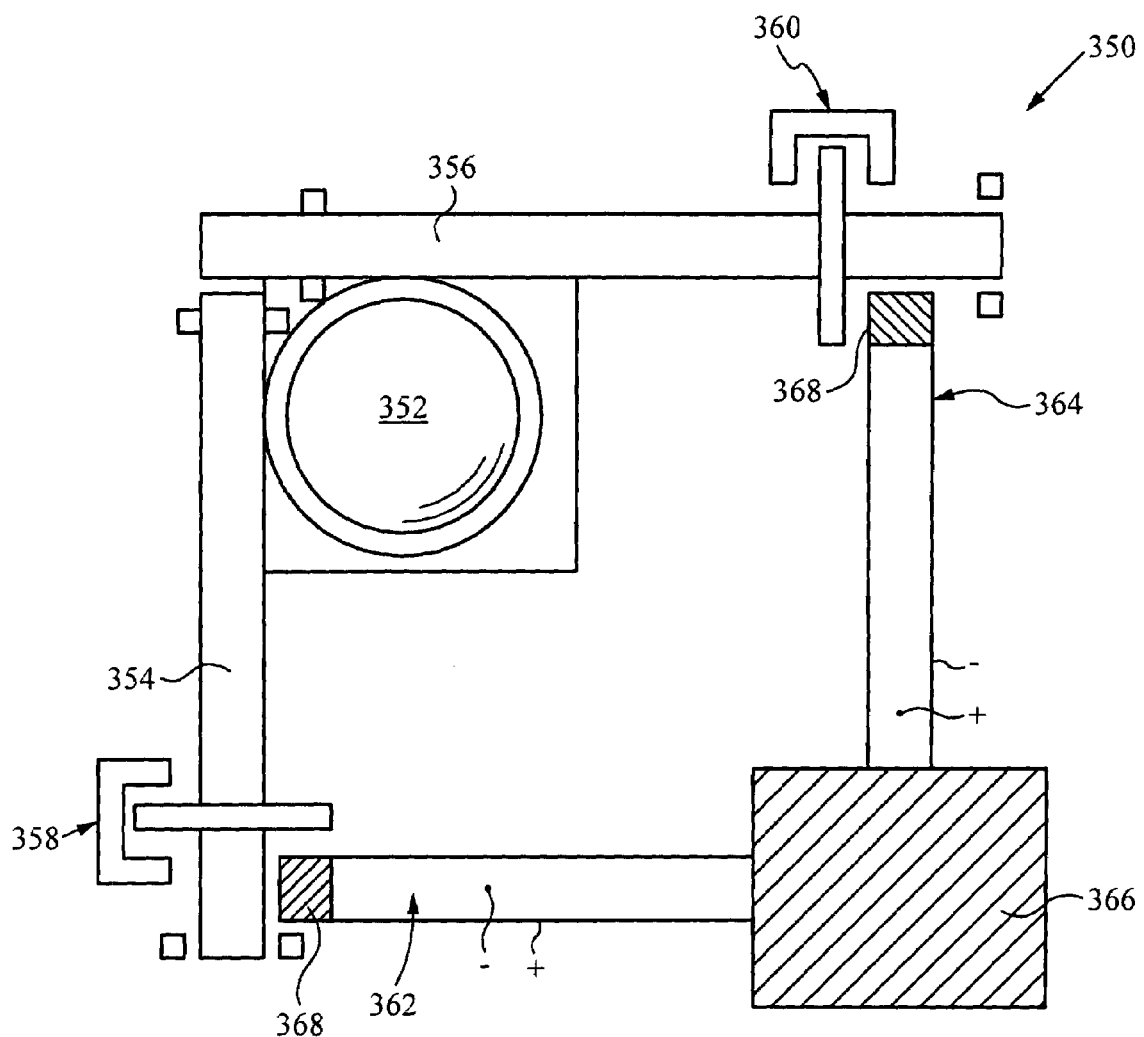
FIG. 6 is a top view of an embodiment in which a sphere is braked by an electroactive polymer actuator.

Ball haptic feedback provides haptic forces acting on a ball, such as a trackball device, a ball used in a sensor mechanism in a mouse device, or other frictional movement device, to output haptic feedback in the degrees of freedom of motion of the interface device. For example, as shown in FIG. 6, a ball actuation assembly 350 includes a sphere or ball 352, an X roller 354, A Y roller 356, an X sensor 358, a Y sensor 360, an X EAP brake 362, a Y EAP brake 364, and a support 366 supporting the brakes. The ball 352 rolls against the cylindrical rollers 354 and 365 (the ball can be biased against the rollers by using, for example, a third roller that is spring biased against the ball). The encoder sensors 358 and 360 sense the position of the rollers, and thus the ball, in the x and y axes by providing an encoder wheel attached to a roller and an emitter-detector to detect slots or marks in the wheel, as is well known. The EAP brakes 362 and 364 each include a brake shoe 368 (which can be of any suitable material) on their ends facing the rollers 354 or 356. The EAP brakes are provided with a control electrical signal to induce linear motion in the EAP elements and thus on brake shoes 368 to cause the brake shoes to frictionally contact the rolling members 354 and/or 356. This frictional contact causes resistance to motion of the ball 352, which the user feels as resistance to motion and haptic feedback. The EAP brakes 362 and 364 can be moved different distances to cause different amounts of friction on the rollers, thus causing different amounts of friction on the ball. This resistance also causes resistance to the mouse in its degrees of freedom, in such embodiments.

Figure 7A:
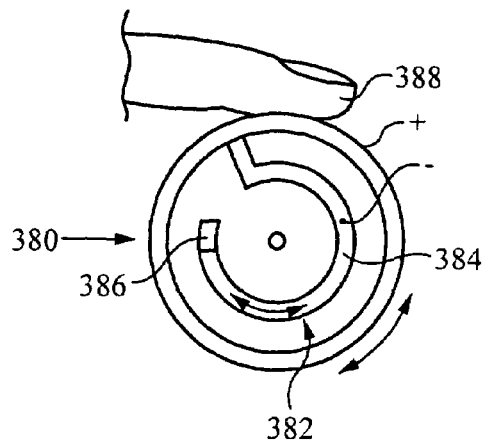
FIG. 7a is a side view of a wheel embodiment in which a rotatable wheel includes an inertial mass that is rotationally moved by an electroactive polymer actuator.

Some embodiments of the interface device 12 can include a wheel, such as mouse wheel 254 shown in FIG. 3. The wheel can be rotated by the user's finger(s) to provide position signals to a computer indicating a position or motion of the wheel, and which can be used to scroll documents displayed by a host computer, move a cursor and select an item in a list, or perform other functions well known to those of skill in the art. Haptic feedback can be output in the rotational degree of freedom of the wheel, and/or on the wheel itself, using an EAP actuator. For example, FIG. 7a illustrates a wheel 380 which includes an EAP rotary inertial shaker 382. The shaker includes a curved EAP element 384 and a mass 386 positioned at the end of the element 384. The mass 386 can be oscillating using a periodic waveform as an input signal, similar to the shaker shown in FIG. 4b. This causes inertial sensation on the wheel 380, which are transferred to the user's finger 388.

Figure 7C:
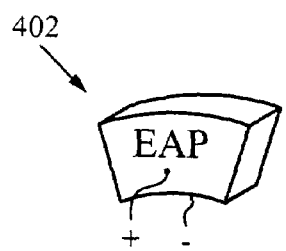
FIGS. 7b and 7c illustrate a wheel embodiment including a number of electroactive polymer actuators which expand in area.
Figure 7B:
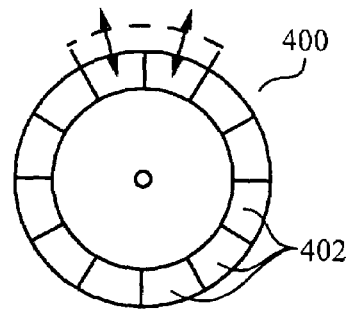

In FIG. 7b, a wheel 400 includes number of radially expanding EAP actuators 402. Each actuator 402, as shown in FIG. 7c, can be similar to the area expansion actuator shown in FIG. 2e above to provide an expanding outer surface to the wheel 400. Multiple EAP actuators are provided around the circumference of the wheel, where the expansion of each actuator can be controlled individually to provide tactile sensations to the user's finger based on the collective movement of those actuators in contact with the user's finger. Other types of EAP actuators, such as linear moving elements, can alternatively be used.

Figure 7D:
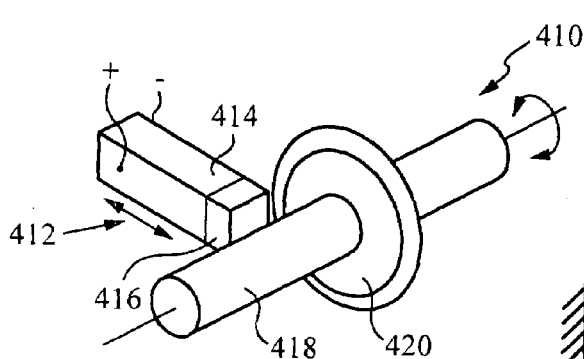
FIG. 7d is a perspective view of a wheel embodiment in which a rotatable wheel is braked by an electroactive polymer actuator.

In FIG. 7d, an EAP brake device 410 is shown which includes an EAP brake 412 that includes an EAP linearly-moving structure 414 coupled to a brake shoe 416. The brake shoe 416 frictionally contacts a rotating axle 418 of the wheel 420, similar to the EAP brake of FIG. 6, to cause resistance in the rotational degree of freedom of the wheel.

Figure 7E:
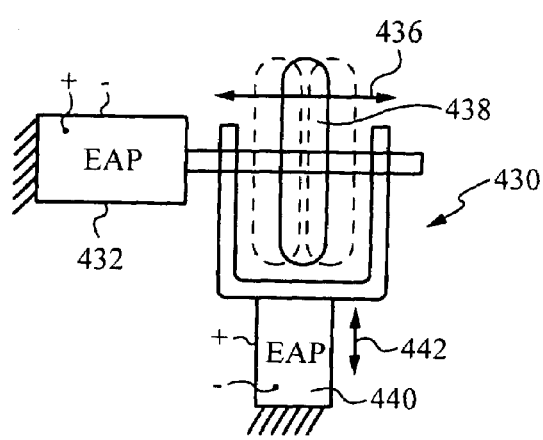
FIG. 7e is a side elevational view of a wheel embodiment in which the entire rotatable wheel is moved laterally and vertically by electroactive polymer actuators.

FIG. 7e illustrates a wheel device 430 that uses an EAP actuator to provide lateral motion or forces on the wheel, parallel to the axis of rotation of the wheel. A linearly-moving EAP actuator 432 can be coupled to the rotating axle 434 (or to a member rotatably coupled to the axle) to provide horizontal forces and motion, as indicated by arrow 436, to wheel 438. Also, in some embodiments, a linearly-moving EAP actuator 440 can be coupled to a member as shown to provide a vertical force or motion on the entire wheel device 430 as indicated by arrow 442. These embodiments can also be used with a rotary control knob used in a variety of devices.

Other interface devices 12 can be provided with haptic feedback using EAP actuators. For example, in FIG. 8a, a "trackpoint" controller 450 is shown, which is often positioned between keys on a standard computer keyboard of a laptop or other computer and used to control a cursor or other pointing function by being moved in normal displacement directions, as shown by arrows 452. For example, the trackpoint can be translated or rotationally moved in the two degrees of freedom. The trackpoint 450 can be provided with an EAP actuator 454, which can be controlled to move linearly vertically (z-axis) in both directions to provide z-axis tactile feedback to the user's finger operating the trackpoint. In some embodiments, the EAP actuator 454 can also or alternatively act as a sensor to detect when the user is contacting the trackpoint and/or the amount of z-axis pressure or displacement exerted by the user on the trackpoint. The amount z-axis pressure can be used to control a value or parameter in an application program, such as a rate control function (scrolling, panning, zooming, velocity of a virtual vehicle in a game, etc.) or the position of a cursor in a representation of a third dimension. The trackpoint controller can be considered the interface device as well as a manipulandum of the interface device.

In FIG. 8b, a trackpoint controller 460 can include a linearly-moving EAP actuator similar to that of FIG. 8a but positioned within a hollow interior of a vertical post 462. The cap 461 of the trackpoint can be textured to allow a stronger user grip and includes an aperture 465. As shown in FIG. 8c, the EAP actuator 464 can be controlled to extend a poker 466 or other member that is coupled to the EAP actuator 464 through the aperture into the skin of the user's finger contacting the top of the trackpoint controller 460. The poker can be withdrawn and extended to provide texture sensations to the user.

FIG. 8d shows another embodiment of a trackpoint controller 470, where EAP actuators are used to provide haptic feedback in the normal x-y directions of control of the trackpoint controller. Four linearly-moving EAP actuators 472 are placed at 90 degree increments around a base 474 of the controller to provide linear force and/or motion to the central vertical post 476. The post can be moved linearly by the user in the x- and/or y-directions to control a cursor, value, etc. It should be noted that the embodiments shown in FIGS. 8a-8d can be used with standard, larger-sized joysticks as well as trackpoint controllers, or other types of interface devices.

Figure 9A:
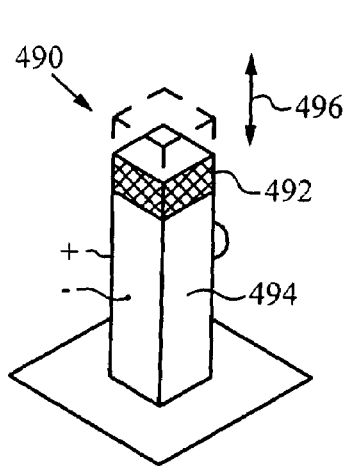
FIG. 9a is a perspective view of a vertical pin moved linearly by an electroactive polymer actuator against a user's finger.
Figure 9B:
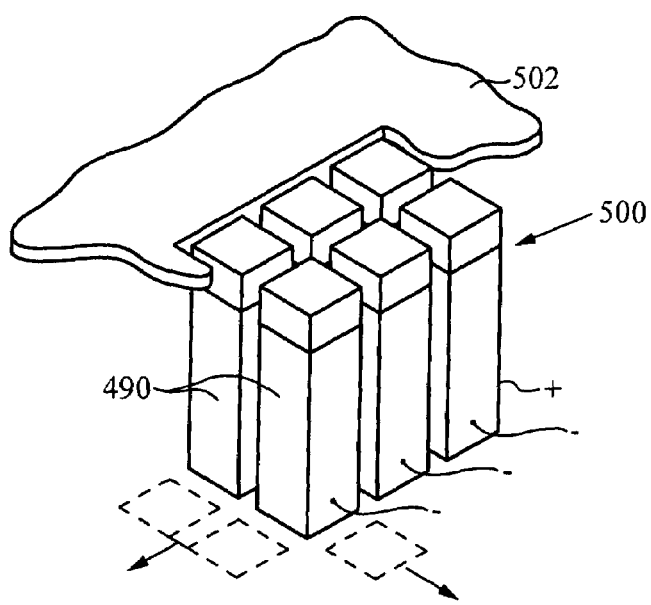
Figure 9C:
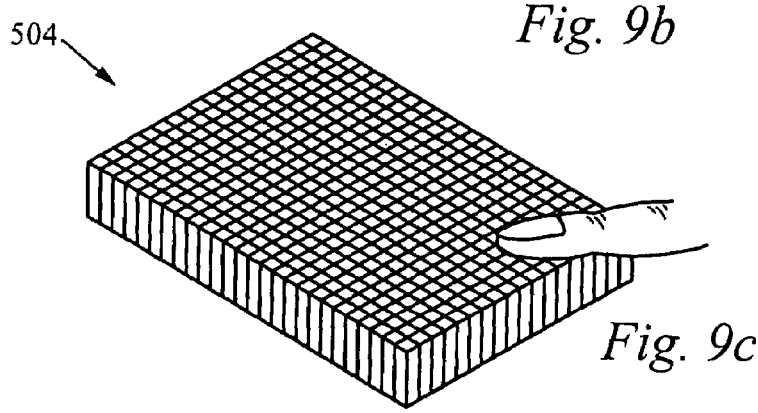

Tactile arrays are multiple vertical "pins" that form a plane of contact perpendicular to the orientation of the pins at the pin's contact surfaces. The contact surfaces of the pins are contacted by a user's fingers or palm. Each pin can be individually moved perpendicularly to the pin's lengthwise axis, such that collectively the pins can be moved to convey different tactile sensations to the user. FIG. 9a shows a single "pin" 490, which is implemented as an EAP actuator 494 that can be linearly moved as indicated by arrow 496. A tactile cap 492 is positioned on the EAP pin 494 to be contacted by a user. In FIG. 9b, a plurality of the pins 490 of FIG. 9a have been positioned in a matrix to form a tactile array 500, where each pin 490 can be individually controlled to move vertically in either direction. An adjacent surface 502 provides a reference surface for the user's fingers. In FIG. 9c, a high density array 504 of EAP pins 490 is shown, where each EAP pin can represent a pixel-sized element. This array of pins can be used to indicate haptically to the user when certain features in a graphical environment are crossed or interacted with. For example, the array can be provided as a trackpad, where the position of the user's finger on the array determines the position of a cursor or entity in a graphical environment. The array of pins can be matrix scanned (or individually addressed) to sense where the user's finger current is on the array. When the user's finger moves over a border of a window, the EAP pins corresponding to the border location are moved upwards, giving the user's finger the sensation of crossing over a 3-D border. Other displayed features such as icons, folders, etc. can also be similarly haptically indicated. The high density array 504 can also be used to provide other tactile sensations based on interactions or events implemented in a computer environment.

Figure 9D:
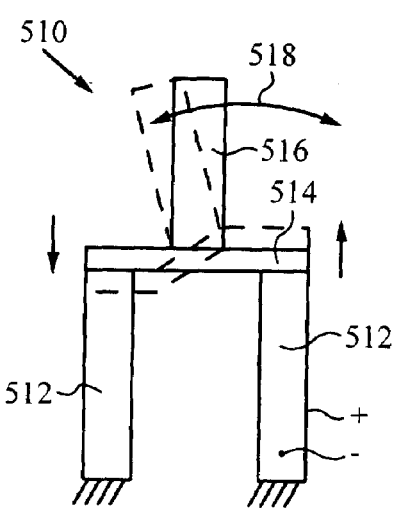
FIGS. 9d and 9e are side views of a vertical pin moved laterally by an electroactive polymer actuator against a user's finger.
Figure 9E:
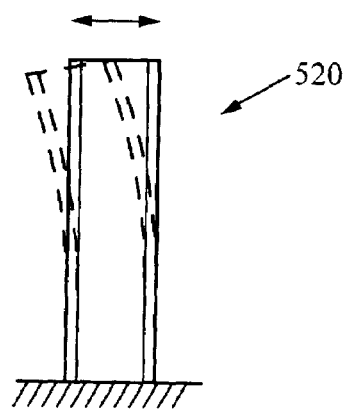

FIG. 9d shows another embodiment 510 using the EAP pins described above. A lateral motion tactile element/array can be provided, where tactile sensations are provided moving pins perpendicular to their lengthwise axes (laterally). Each pin is moved laterally to provide stretching of the user's skin or shear sensations instead of indenting the skin of the user as in the embodiments of FIGS. 9a-9c. More space can be provided between the pins to allow for the lateral motion. When using EAP actuators, one way to provide such lateral motion is to place two linearly-moving EAP actuators 512 on a grounded element, and place a flexible membrane 514 (or other member) over the actuators 512, where a lateral moving element 516 is placed on the flexible membrane 514 as shown in FIG. 9d. One or both of the EAP actuators 512 is moved vertically (if both are moved, it is in opposite directions), causing the flexible membrane to flex and the lateral element 516 to rock left or right as indicated by arrow 518. Alternatively, as shown in FIG. 9e, an EAP structure 520 that can be directly moved laterally using a control signal, such as referred to above in FIG. 2b and/or an element having sandwiched layers, can be used to provide the desired lateral motion. The actuator 520 can be moved laterally in one degree of freedom, or in some embodiments can be moved in two.

Figure 10:
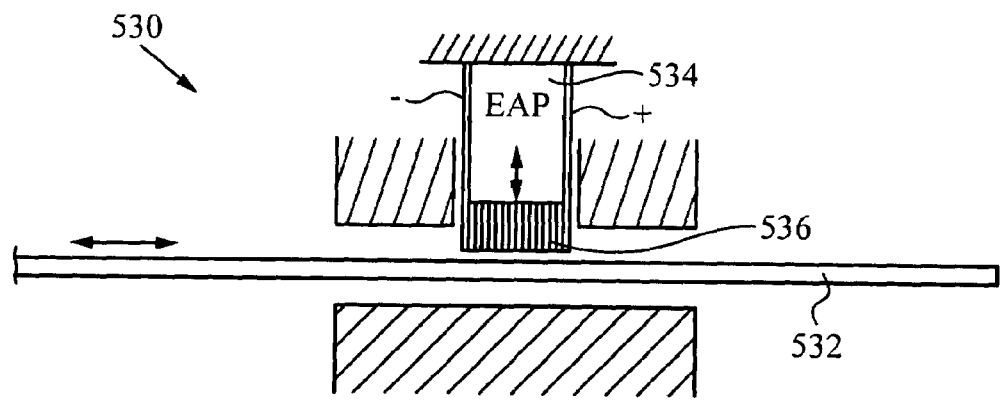
FIG. 10 is a side elevational view of a device in which an electroactive polymer actuator provides braking forces on a medical tool.

EAP actuators can be used to provide specific forces in particular applications. For example, FIG. 10 is a side elevation view of an EAP brake 530 used in a medical device, where a catheter wire 532 (or laparoscopic extension, needle, or other portion of medical or other instrument) is used in a haptic feedback medical simulation that provides forces on the medical instrument to simulate a medical procedure. An EAP brake includes an EAP element 534 that is coupled to a brake shoe 536 that can be moved laterally against the catheter wire 532, causing friction in the linear degree of freedom of the wire. The amount of friction can be adjusted by moving the EAP brake different distances. Another EAP brake can be used to provide resistance in the rotary degree of freedom of the wire 532.

Figure 11:
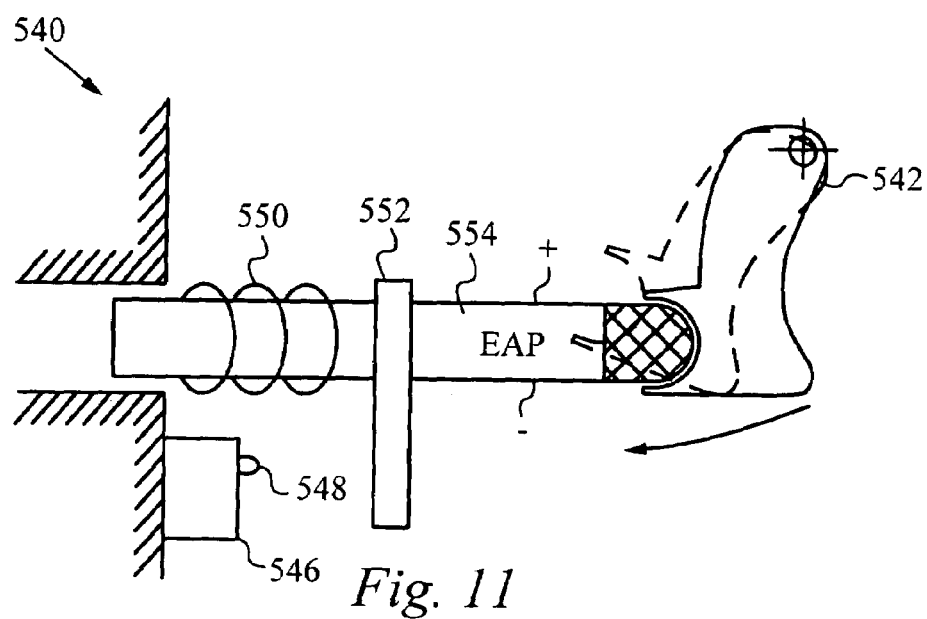
FIG. 11 is a side elevational view of a device in which an electroactive polymer actuator provides forces to a trigger on an interface device.

Trigger devices can also make use of EAP actuators. FIG. 11 is a side elevational view of a device 540 including a trigger 542 that is pressed by a user to provide a signal to a game, simulation, or other program or device. The trigger 542 can be included in an interface device such as a gamepad, joystick, mouse, etc. For example, the trigger 542 can rotate about an axis of rotation B, which can be a coupling to a housing of the interface device. An EAP actuator 544 can be positioned between the trigger and a grounded switch 546. The switch 546 sends a signal indicating activation when a portion 548 is pressed. A spring 550 normally biases a contact plate 552 away from the switch 546; when the plate 552 is moved by the EAP actuator 544, the spring is compressed and the plate hits the portion 548 of the switch 546, activating it. The spring 550, meanwhile, biases the trigger back to its origin or rest position as well as providing a spring resistance force to trigger motion. The EAP actuator can be used to move in opposition to, or in conjunction with, trigger motion to provide a haptic sensation to the user pushing the trigger (this EAP force can supplement or override the spring force from 550). The actuator can thus make it easier or more difficult for the trigger to cause the switch to change states. For example, different resistances, damping, pulses, or vibrations can be output, as in all the linear EAP actuator embodiments described herein.

Figure 12A:
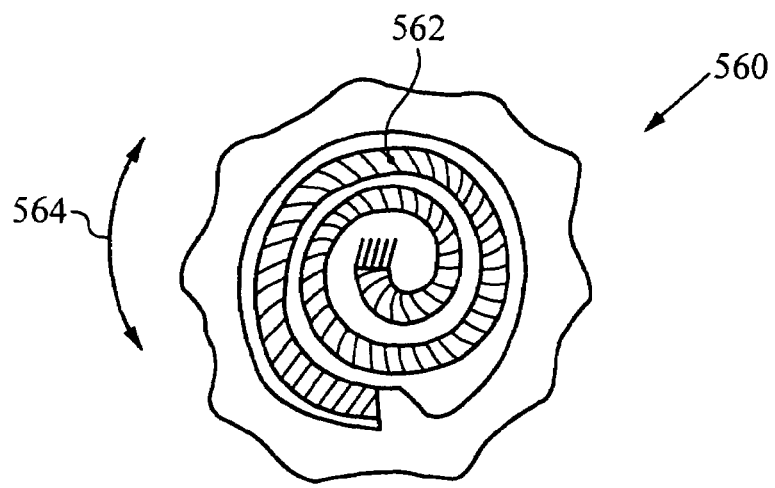
FIG. 12a is a front view of a knob in which an electroactive polymer actuator provides direct rotary forces in the rotary degree of freedom of the knob.

FIG. 12a shows a rotary knob 560 that can be used to control functions in a wide variety of devices. A spiral or coil EAP actuator 562 can be positioned inside the knob so that the EAP actuator exerts a torque on the knob when it is activated. Resistance or force can thus be provided in the rotary degree of freedom of the knob, as indicated by arrow 564, although a knob of limited rotational range should be used.

Figure 12B:
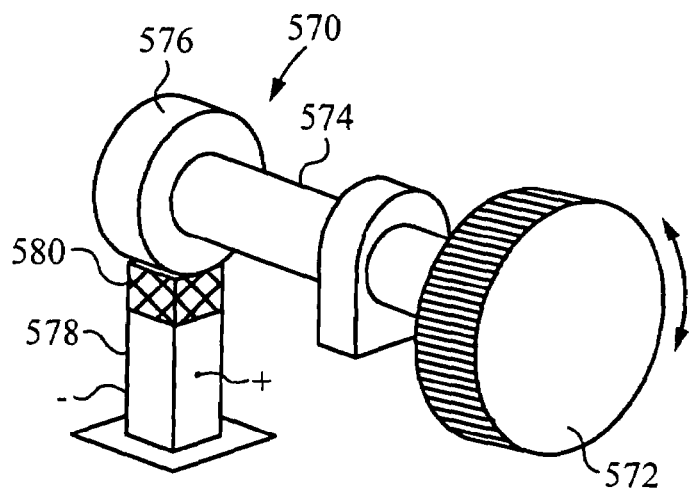
FIG. 12b is a perspective view of a knob in which an electroactive polymer actuator provides braking forces in the rotary degree of freedom of the knob.

FIG. 12b illustrates a knob device 570 that includes an EAP actuator. Knob 572 is coupled to a rotating shaft 574, which is coupled to a cylindrical brake member 576 that can include a frictional surface. EAP actuator 578 includes a brake shoe 580 that is moved by the actuator 578 to contact the brake member 576. This engagement provides frictional forces on the shaft 574 and knob 572. This embodiment allows a knob having an unlimited (continuous) rotational range to be used. A linear EAP element can be used, as described in braking embodiments above.

Figure 13:
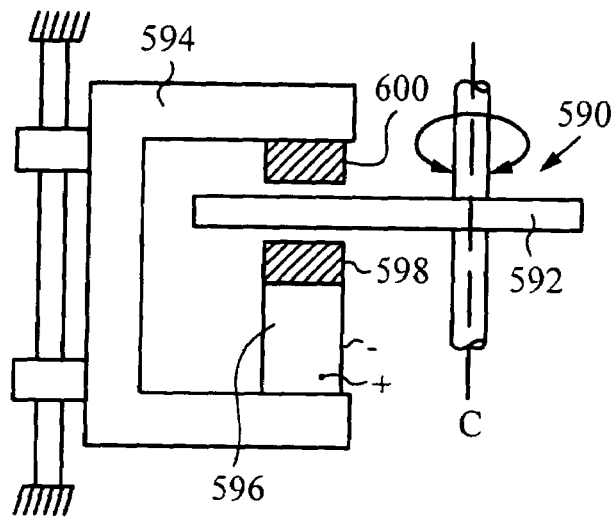
FIG. 13 is a side view of a rotating disc in which an electroactive polymer actuator provides braking forces in the rotary degree of freedom of the disc.

FIG. 13 is a side elevational view of a braking embodiment 590 for a rotating disk. Disk 592 rotated about axis C. A caliper 594 is positioned at one end of the disk, and an EAP actuator 596 is coupled to one end of the caliper. The EAP actuator can be moved linearly to move a brake shoe 598 against the spinning cross-sectional surface of the disk, thus causing frictional resistance to the disk. A brake shoe 600 can be positioned on the other end of the caliper 594, opposite the brake shoe 598. The disk can be coupled to a variety of objects, such as a joystick handle or mouse, a rotating finger wheel or knob, or a rotating axle in a vehicle.

A stylus-shaped interface device can also be provided with an EAP actuator to produce haptic feedback to the user of the stylus. A stylus can be used to point to or select objects on a screen, or draw or write lines by contacting the stylus with a tablet or with a display screen surface, e.g. on Personal Digital Assistants (PDA's), touch screens, graphics tablets, laptop computers, etc. For example, FIG. 14a shows a stylus 610 having a moveable tip 612, where the tip is moved by an EAP actuator 614 that is coupled to the tip and positioned inside the stylus housing. The EAP actuator moves linearly and causes the tip member 616 to move linearly through an aperture in the stylus housing. The EAP actuator can be controlled to produce vibrations, pulses, or other force sensations on the tip and thus to the user holding the stylus.

FIG. 14b shows a different embodiment 620 that causes a front end portion 622 of the stylus to linearly move with respect to the back portion 624 of the stylus. A rubber bellows 626 can be positioned between the moving front portion and the back portion, and an EAP actuator (not shown) can be positioned inside the stylus housing. The EAP actuator can be a linearly-moving element that is coupled to the front end portion 622 to move that portion similarly to moving the tip member as shown in FIG. 14a. Haptic sensations can be output to the user similarly as described with respect to FIG. 14a.

Other features of a stylus can also be actuated using EAP actuators. In FIG. 14c, a stylus 640 is shown having a button 642 which can be controlled (by a host computer or other controller) to linearly move back and forth by coupling a linearly moving EAP actuator 644 to the button as shown. The button can be actuated to correspond to interactions between a controlled cursor and other displayed objects, for example.

In FIG. 14d, a stylus 650 includes an expanding grip 652 which can be implemented using EAP actuators. The cylindrical grip provides an expanding circumference that is haptically discernible to the user gripping the cylindrical grip. The grip can be expanded and contracted to provide various haptic sensations, such as pulses, vibrations, 3-D surface simulations, etc. The grip can be implemented using a plurality of EAP actuators 654 (four are shown) that are disc-shaped and which expand in circumference with the activation signal is applied, as indicated in FIG. 14e which shows a single EAP actuator 654. These actuators can be similar to the EAP structure described above with respect to FIG. 2e.

Figure 15A:
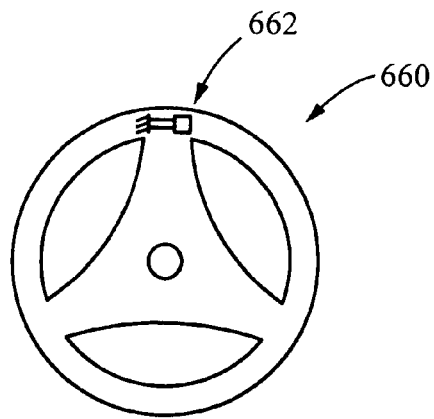
FIG. 15a is a front view of a steering wheel in which an electroactive polymer actuator provides inertial forces.
Figure 15B:
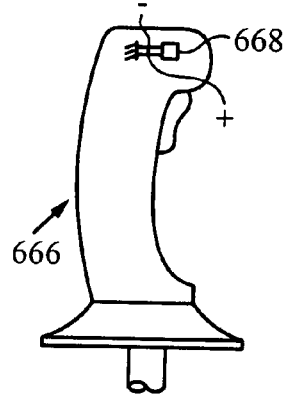
FIG. 15b is a side view of a joystick handle in which an electroactive polymer actuator provides inertial forces.

Other devices can also be used with EAP actuators. For example, as shown in FIG. 15a, a steering wheel 660 of a steering wheel controller device can be provided with an EAP inertial shaker 662 coupled in or on the wheel to provide inertial forces to the user contacting the steering wheel and which are coordinated with displayed events or interactions. The inertial shaker can be similar to the shaker described above with reference to FIG. 4a. Brakes can also be provided to exert frictional forces in the degree of freedom of the steering wheel, similar to the knob of FIG. 12b. FIG. 15b shows a joystick handle 666 of a joystick controller, where the handle is similarly outfitted with an inertial EAP actuator 668 provided within the joystick handle to output inertial forces on the joystick handle.

Figure 15C:
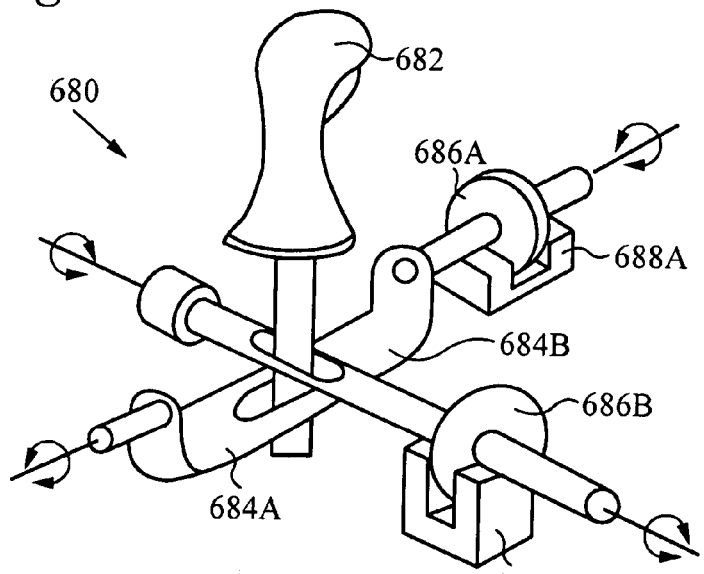
FIGS. 15c and 15d are perspective and side elevational views of a joystick handle in which electroactive polymer actuators provide braking forces in the degrees of freedom of the joystick handle.
Figure 15D:
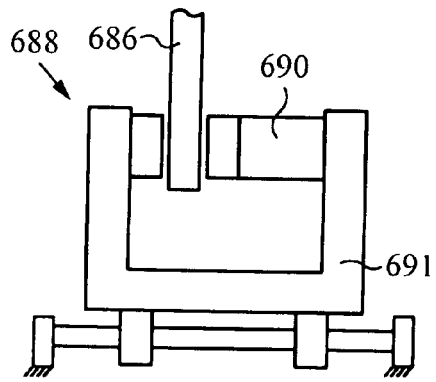

FIG. 15c is a perspective view of a joystick embodiment 680 that provides passive force feedback to the joystick. Joystick handle 682 is placed in apertures of two rotating members 684a and 684b. When the handle 682 is rotated in a direction, the corresponding member 684 rotates as well. Frictional brake disks 686a and 686b are coupled to their associated rotating members 684a and 684b. EAP brakes 688a and 688b provide frictional forces on the disks 686 which causes resistance in the two degrees of freedom of the joystick handle (sensors, not shown, sense the rotational motion of the joystick handle). For example, the EAP brakes can include linearly-moving elements, similar to other brake embodiments described herein. FIG. 15d illustrates one example of an EAP brake caliper that can be used as an EAP brake 688, where a linearly-moving EAP actuator 690 coupled to a caliper support 691 can be coupled to a brake shoe 692 that frictionally contacts the disk 686.

Figure 16:
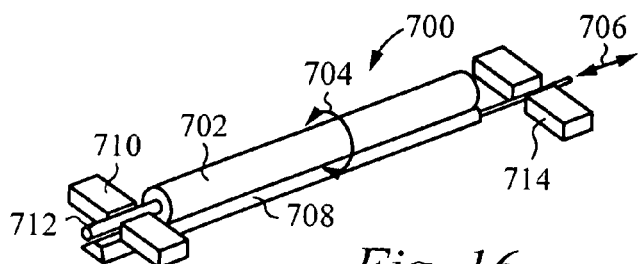
FIG. 16 is a perspective view of a rotating cylinder controller in which electroactive polymer actuators provide braking forces in the degrees of freedom of the cylinder.

EAP actuators as disclosed herein can also be used on other types of controllers. For example, FIG. 16 is a perspective view of a cylindrical pointer controller 700, which includes a cylinder 702 that can be rotated about its lengthwise axis as indicated by arrow 704 to provide input in one degree of freedom (e.g. move a cursor along one axis) and can be translated parallel to its axis of rotation as indicated by arrow 706 on a carriage 708 to provide input in another degree of freedom (e.g. move a cursor along the other axis). Sensors (not shown) detect the rotation and translation. Such a controller is described in greater detail in U.S. Pat. No. 4,896,554, incorporated herein by reference. In one embodiment, an EAP brake 710 can move a brake shoe against an axle 712 coupled to the cylinder to provide frictional braking forces in the rotational degree of freedom. That EAP brake and the cylinder can be translated linearly on carriage 708, and another EAP brake 714 can apply braking frictional forces on the carriage in the translatory degree of freedom. Other types of EAP actuators can also be used in a cylindrical controller, e.g. inertial shakers.

Figure 17A:
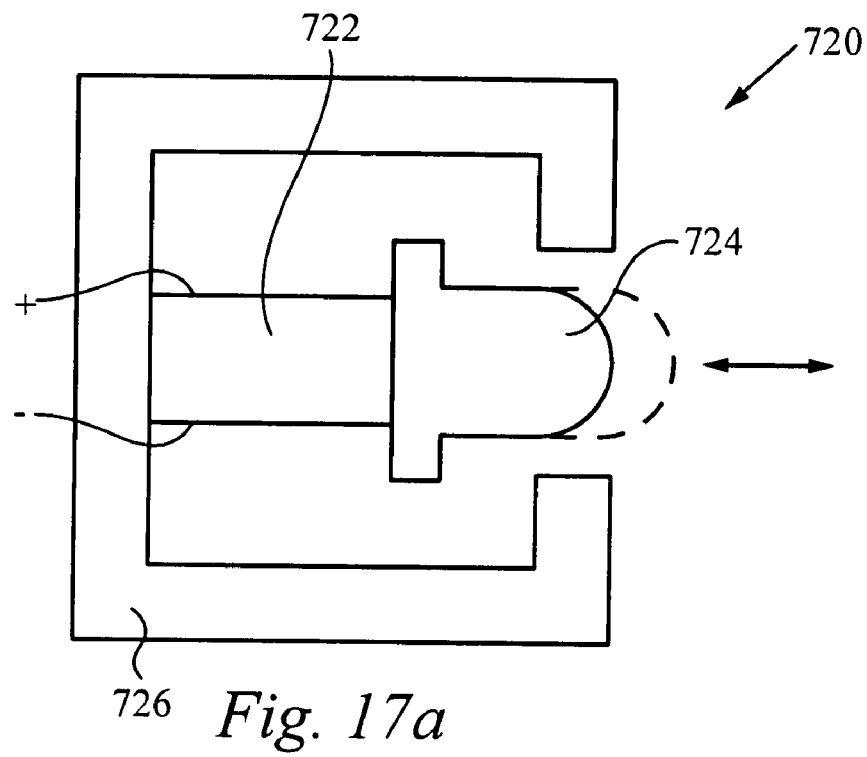
FIG. 17a is a side elevational view of a tactile element in which electroactive polymer actuators provide linear motion to the element.

FIG. 17a illustrates an embodiment 720 providing skin tactors using an EAP actuator. Skin tactors are similar to the pin grid arrays described above, in which one or more moving elements contacts a user's skin to provide a tactile sensation. One or more skin tactors can be provided in a haptic glove to engage the user's fingers and palm, in arrays on a vest to engage the user's chest or other body parts, or in other areas that can contact a user's skin. In FIG. 17a, an EAP linearly-moving actuator 722 is coupled to a tactor element 724, where the tactor element is moved linearly into the user's skin through an opening in a support 726. The tactor element is preferably moved and/or oscillated with a waveform similarly to the pin grid arrays described above.

Figure 17B:
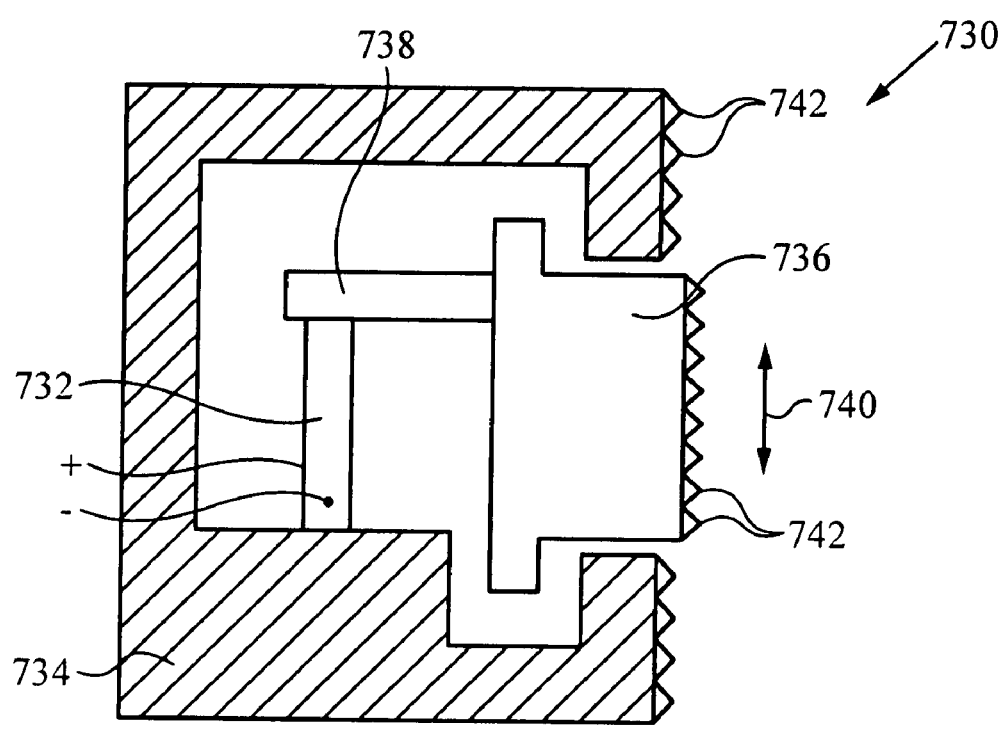
FIG. 17b is a side elevational view of a tactile element in which electroactive polymer actuators provide lateral, shear motion to the element.

FIG. 17b illustrates another embodiment 730 having tactor elements. A linearly-moving EAP actuator 732 is coupled to a support 734. A tactor element 736 is coupled to a member 738 that is coupled to the end of the actuator 732. When the actuator 732 is moved linearly, the tactor element is moved laterally as indicated by arrow 740. This motion stretches the user's skin instead of moving an element into the skin. The grounded surface surrounding the tactor element, as well as the tactor element itself, can include ridges 742 or bumps to engage the user's skin. The stationary ridges on the grounded surface hold an engaged portion of the user's skin in place, while the moving ridges on the tactor element 736 stretch the middle area of the engaged portion of user's skin, creating a highly effective tactile sensation.

Other types of interface devices can employ EAP actuators, such as touchpads on laptop computers, PDA and game device screens used with styluses or fingers, etc., where haptic sensations are output directly on the touchpad or screen. For example, the touchscreens and touchpads disclosed in copending application Ser. No. 09/487,737, incorporated herein by reference in its entirety, can be coupled to bending, inertial shaker, or linearly-moving EAP actuators as disclosed herein rather than, for example, piezoelectric actuators. Tactile computer keyboards and keypads (as disclosed in copending application Ser. No. 09/570,361, incorporated herein by reference in its entirety), direction pads on gamepads (as disclosed in copending application Ser. No. 09/467,309, incorporated herein by reference in its entirety), and other interface devices may be used with the EAP actuators according to the present invention.

While this invention has been described in terms of several preferred embodiments, it is contemplated that alterations, permutations and equivalents thereof will become apparent to those skilled in the art upon a reading of the specification and study of the drawings. For example, many different types of haptic sensations can be provided with the actuators of the present invention. Furthermore, certain terminology has been used for the purposes of descriptive clarity, and not to limit the present invention.

The invention claimed is:

1. A device comprising;
  a housing having a touch surface adapted to be touched by a user;
  a sensor coupled to the touch surface and configured to detect at least one of a position or movement of the user's touch on at least a portion of the touch surface, the sensor configured to output sensor signals associated with the position or movement; and
  an electroactive polymer actuator coupled to the housing and configured to output a haptic feedback force upon receiving an control signal from a processor, the control signal being associated with the output sensor signals.

2. The device of claim 1, wherein the touch surface is oriented along a plane, the electroactive polymer actuator outputting the haptic feedback force in a direction substantially perpendicular to the plane.

3. The device of claim 1 wherein the electroactive polymer physically moves in the direction substantially perpendicular to the plane upon receiving the control signal.

4. The device of claim 1, wherein the electroactive polymer further comprises a plurality of electroactive polymer actuator pins, each pin physically moveable in the direction substantially perpendicular to the plane upon receiving the control signal.

5. The device of claim 4, further comprising a flexible membrane coupled to an end of two adjacent electroactive polymer actuators in plurality, wherein movement of at least one of the actuators imparts force on the membrane.

6. The device of claim 1, wherein the processor is of a computer system running a program displaying a graphical user interface, wherein at least a portion of the graphical user interface is configured to cause the processor to output the control signal upon the sensor output signals indicating the position or movement at a designated haptic location on the graphical user interface.

7. The device of claim 1, wherein the touch surface is a touch screen configured to receive inputs from the user to a graphical user interface via the touch surface.

8. A method comprising;
  selecting a housing having a touch surface adapted to be touched by a user;
  sensing at least one of a position or movement of the user's touch on at least a portion of the touch surface using a sensor, the sensor configured to an output sensor signal associated with the position or movement to a processor; and
  outputting a haptic feedback force using an electroactive polymer actuator upon receiving an control signal from a processor, wherein the control signal is associated with the output sensor signal.

9. The method of claim 8, wherein the outputting further comprises outputting the haptic feedback force in a direction substantially perpendicular to a plane of the touch surface.

10. The method of claim 9, wherein the electroactive polymer physically moves in the direction substantially perpendicular to the plane upon receiving the control signal.

11. The method of claim 8, wherein the electroactive polymer further comprises a plurality of electroactive polymer actuator pins, each pin physically moveable in the direction substantially perpendicular to the plane upon receiving the control signal.

12. The method of claim 11, further comprising a flexible membrane coupled to an end of two adjacent electroactive polymer actuators in plurality, wherein movement of at least one of the actuators imparts force on the membrane.

13. The method of claim 8, further comprising running a program displaying a graphical user interface, wherein at least a portion of the graphical user interface is configured to cause the processor to output the control signal upon the sensor output signals indicating the position or movement at a designated haptic location on the graphical user interface.

14. The method of claim 8, wherein the touch surface is a touch screen configured to receive inputs from the user to a graphical user interface via the touch surface.

15. Logic encoded in one or more tangible media for execution and when executed operable to perform a method, the method comprising:
  receiving a sensor signal associated with a sensed position or movement of a user's touch on a touch surface having a sensor coupled thereto, wherein the sensor outputs the sensor signal; and
  outputting a control signal to an electroactive polymer actuator upon the sensor signal indicating the sensed position or movement of the user's touch is at a designated haptic feedback force location, wherein the electroactive polymer actuator output a haptic feedback force to the touch surface upon receiving the control signal from a processor.

16. The method of claim 15, wherein the control signal causes the electroactive polymer actuator to output the haptic feedback force in a direction substantially perpendicular to a plane of the touch surface.

17. The method of claim 16, wherein the electroactive polymer physically moves in the direction substantially perpendicular to the plane upon receiving the control signal.

18. The method of claim 15, wherein the electroactive polymer further comprises a plurality of electroactive polymer actuator pins, each pin physically moveable in the direction substantially perpendicular to the plane upon receiving the control signal.

19. The method of claim 18, further comprising a flexible membrane coupled to an end of two adjacent electroactive polymer actuators in plurality, wherein movement of at least one of the actuators imparts force on the membrane.

20. The method of claim 15, further comprising running a software program displaying a graphical user interface, wherein at least a portion of the graphical user interface is configured to cause the outputting of the control signal upon the sensor output signals indicating the position or movement at the designated haptic location on the graphical user interface.

* * * * *